US006845208B2

(12) United States Patent
Thibault et al.

(10) Patent No.: US 6,845,208 B2
(45) Date of Patent: Jan. 18, 2005

(54) OPTICAL HIGH-DENSITY DISTRIBUTION FRAME AND METHOD FOR MAKING JUMPER CONNECTIONS IN SUCH A DISTRIBUTION FRAME

(75) Inventors: Jean-Pierre Thibault, Guyancourt (FR); Alain Vincent, Juilly (FR); Alain Lepeuve, Noisy le Roi (FR); Bertrand Joly, Sevres (FR); Didier Lecomte, Cavaillon (FR)

(73) Assignee: Nexans (FR)

( * ) Notice: Subject to any disclaimer, the term of this patent is extended or adjusted under 35 U.S.C. 154(b) by 113 days.

(21) Appl. No.: 10/291,215

(22) Filed: Nov. 8, 2002

(65) Prior Publication Data

US 2003/0118311 A1 Jun. 26, 2003

(30) Foreign Application Priority Data

Nov. 13, 2001 (FR) .......................................... 01 14958

(51) Int. Cl.[7] ................................................ G02B 6/00
(52) U.S. Cl. ...................................................... 385/135
(58) Field of Search ................................. 385/134–137

(56) References Cited

U.S. PATENT DOCUMENTS

| 5,317,663 A | * | 5/1994 | Beard et al. ................... 385/70 |
| 5,461,693 A | | 10/1995 | Pimpinella ................... 385/135 |
| 5,717,810 A | * | 2/1998 | Wheeler ....................... 385/135 |
| 5,987,203 A | | 11/1999 | Abel et al. ..................... 385/51 |
| 6,157,766 A | | 12/2000 | Laniepce et al. ........... 385/134 |

FOREIGN PATENT DOCUMENTS

| EP | 215668 A2 * | 3/1987 | ............ G02B/6/44 |
| EP | 0724367 | 7/1996 | |
| FR | 2648300 | 6/1989 | |
| JP | 9159841 | 6/1997 | |
| WO | 9520175 | 7/1995 | |

OTHER PUBLICATIONS

Preliminary Search report for French Application serial No. FR 0114958 dated Aug. 2, 2002.

"High density pin board matrix switches for automated MDF systems" IEEE Transactions on components . Hybrids and manufacturing Technology p 893–903, by Kanai et al., Oct. 15, 1992.

* cited by examiner

*Primary Examiner*—Akm Enayet Ullah
*Assistant Examiner*—Sarah Song
(74) *Attorney, Agent, or Firm*—Sofer & Haroun, LLP

(57) ABSTRACT

The distribution frame and the method relate to a telecommunication installation in which optical fiber links are connected to connection members formed by sockets distributed on the front face of at least one distribution rack and in which jumpers provide the links between the connection members to which the links are individually connected. A robotized set of specialized tools is provided:

to mount a plug on one end of a jumper reserve stored in coiled form;

to position the plug in a connection member of a socket;

to fit the jumper uncoiled from this member as far as another member;

to adjust the length and to cut a section of uncoiled jumper; and to mount a plug on the end of the section and to position this plug in the other member.

15 Claims, 9 Drawing Sheets

FIG_1
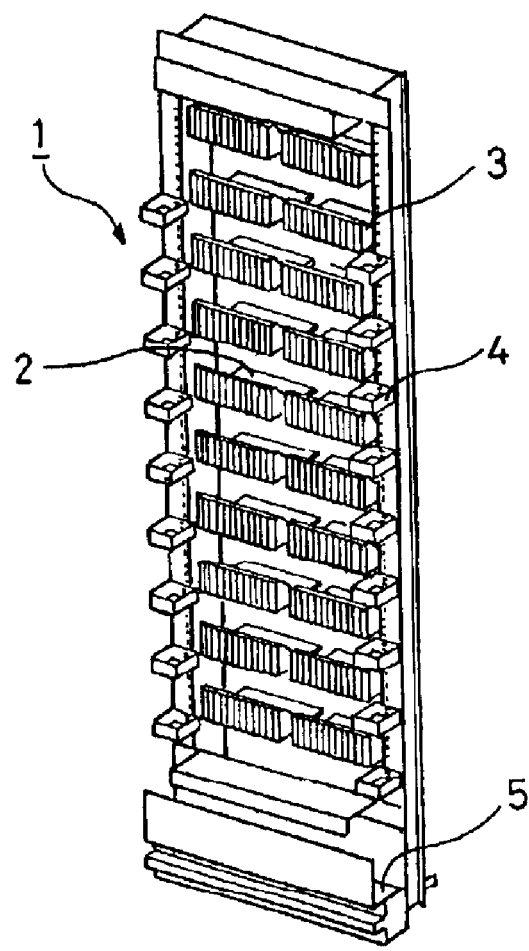
FIG_2
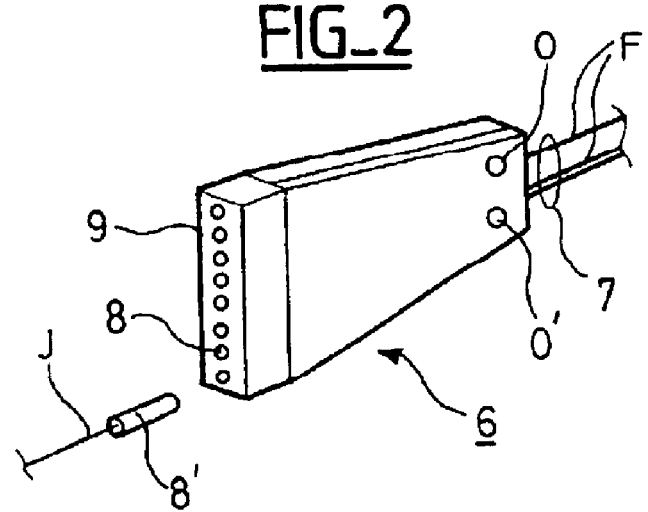

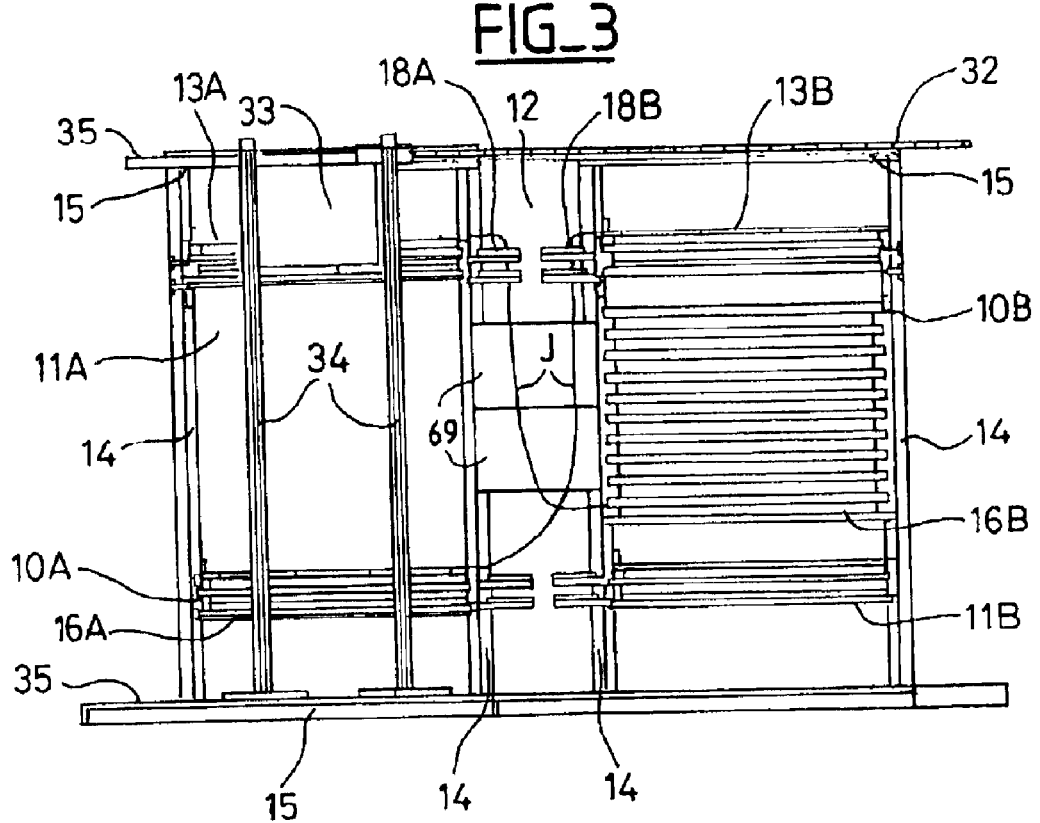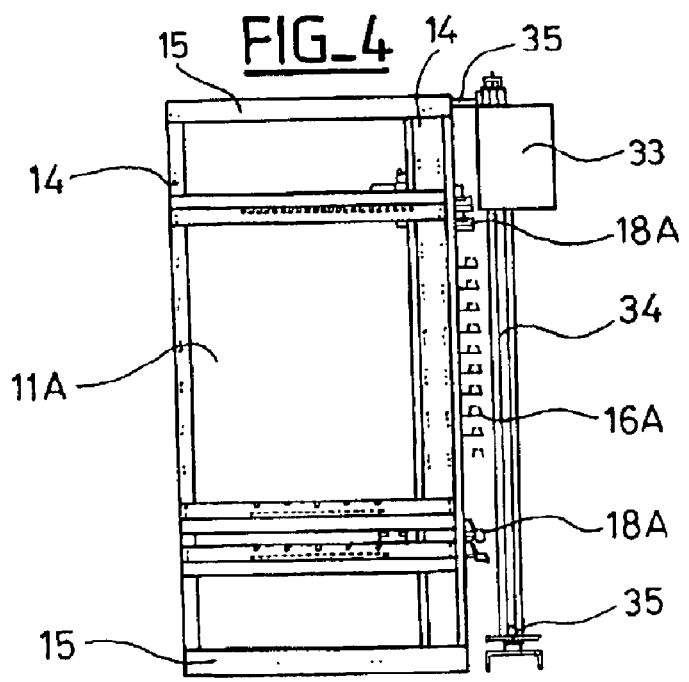

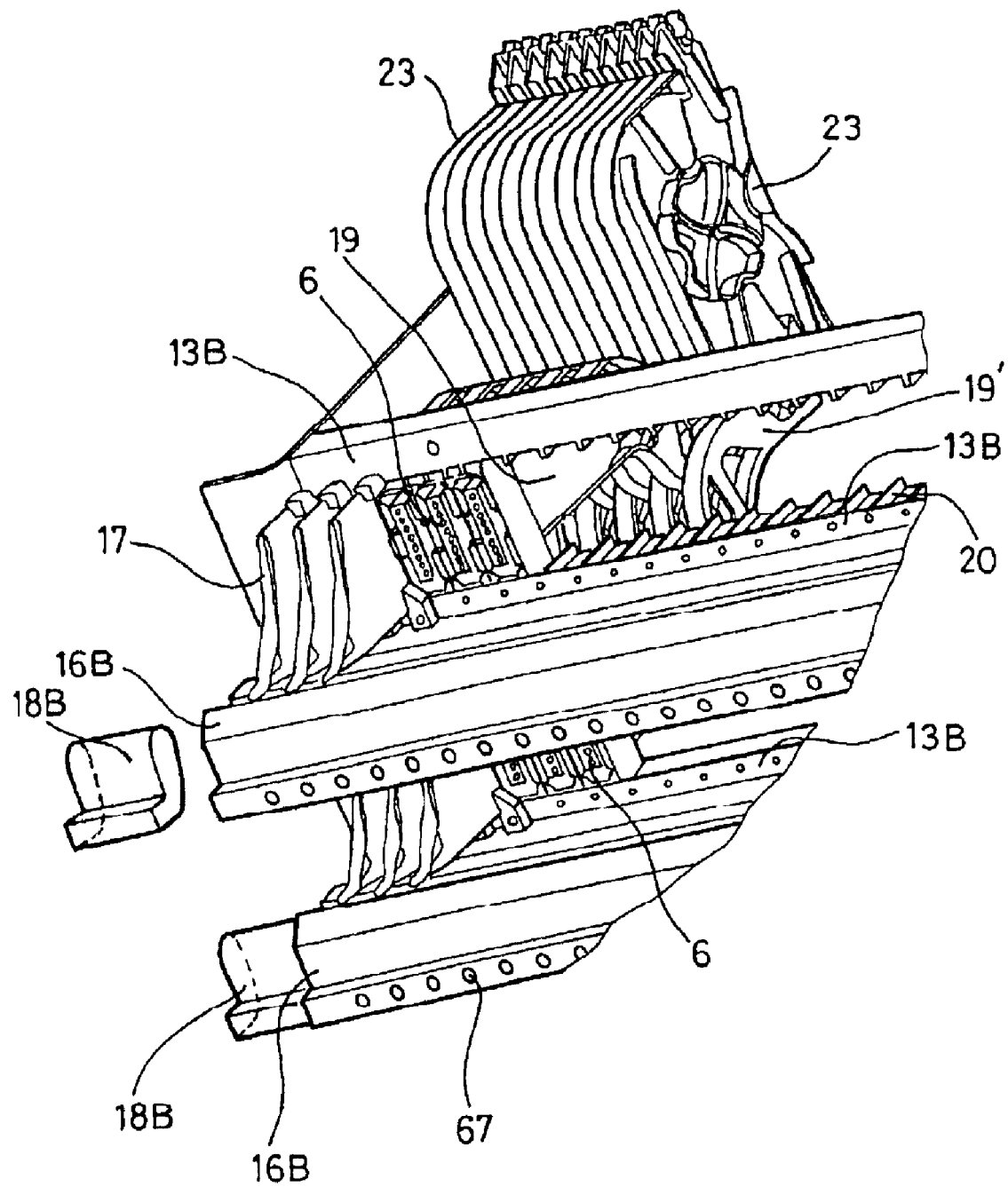
FIG_5

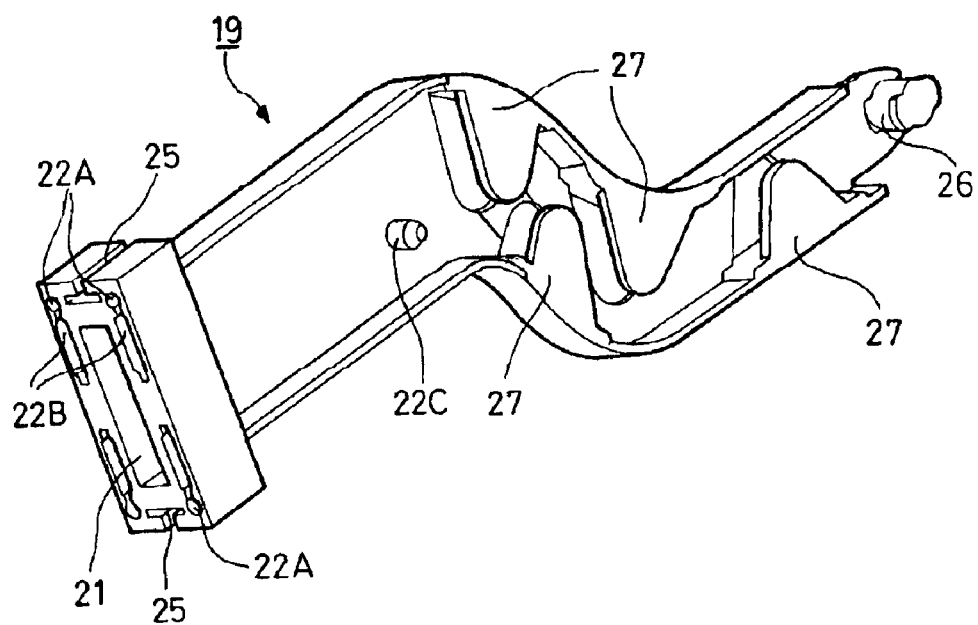
FIG_6
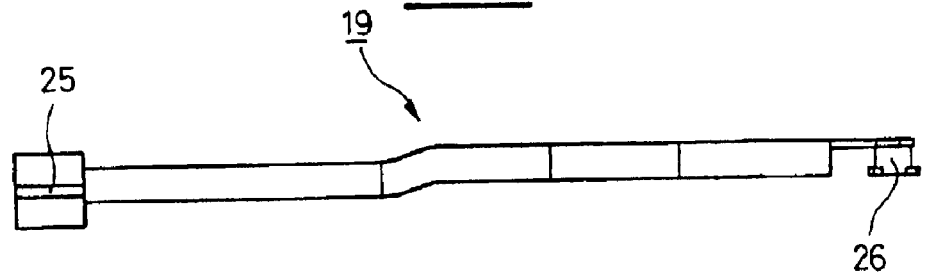
FIG_7

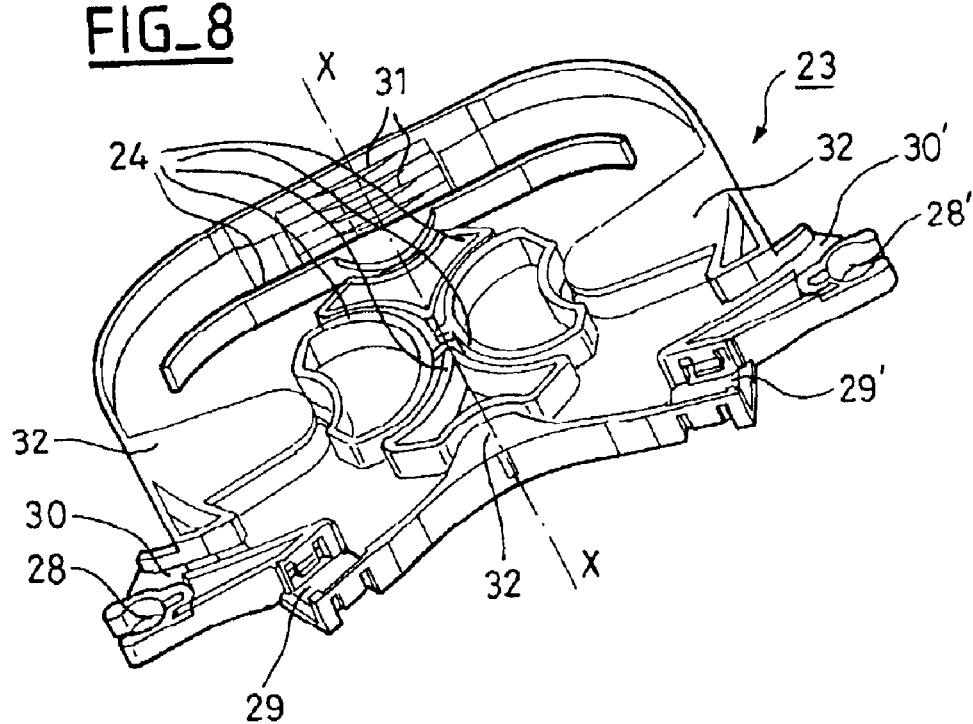
FIG_8
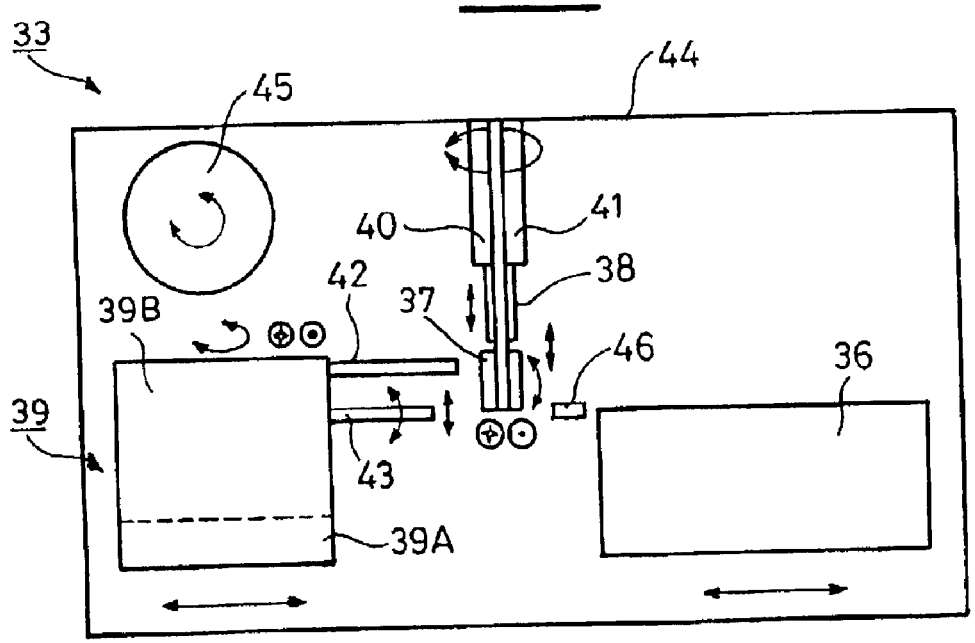
FIG_9

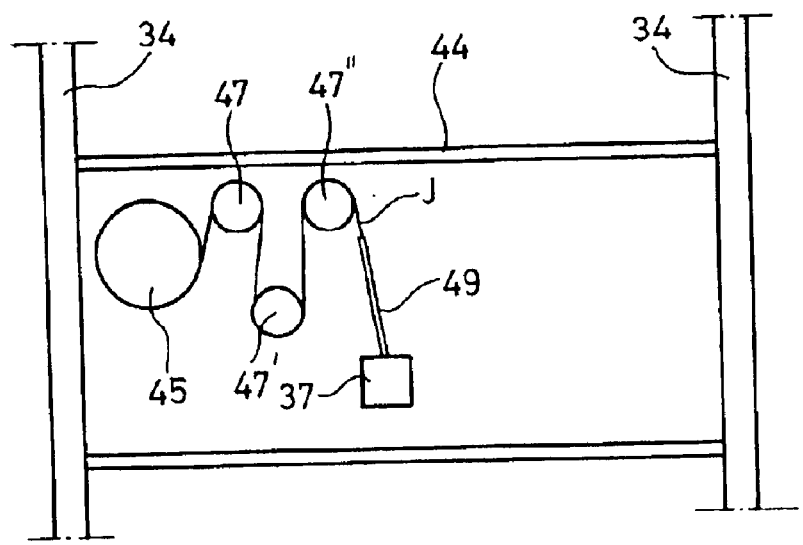
FIG_10
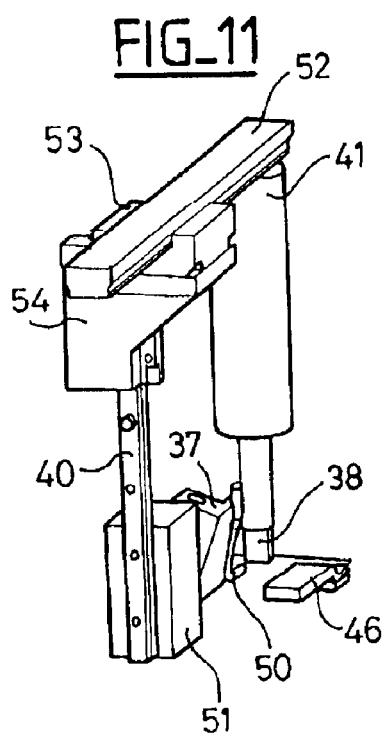
FIG_11
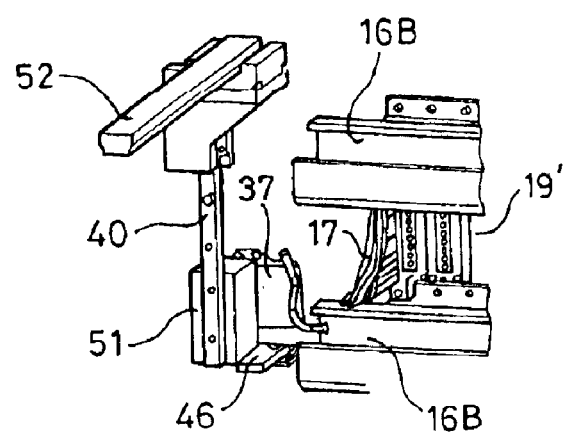
FIG_12

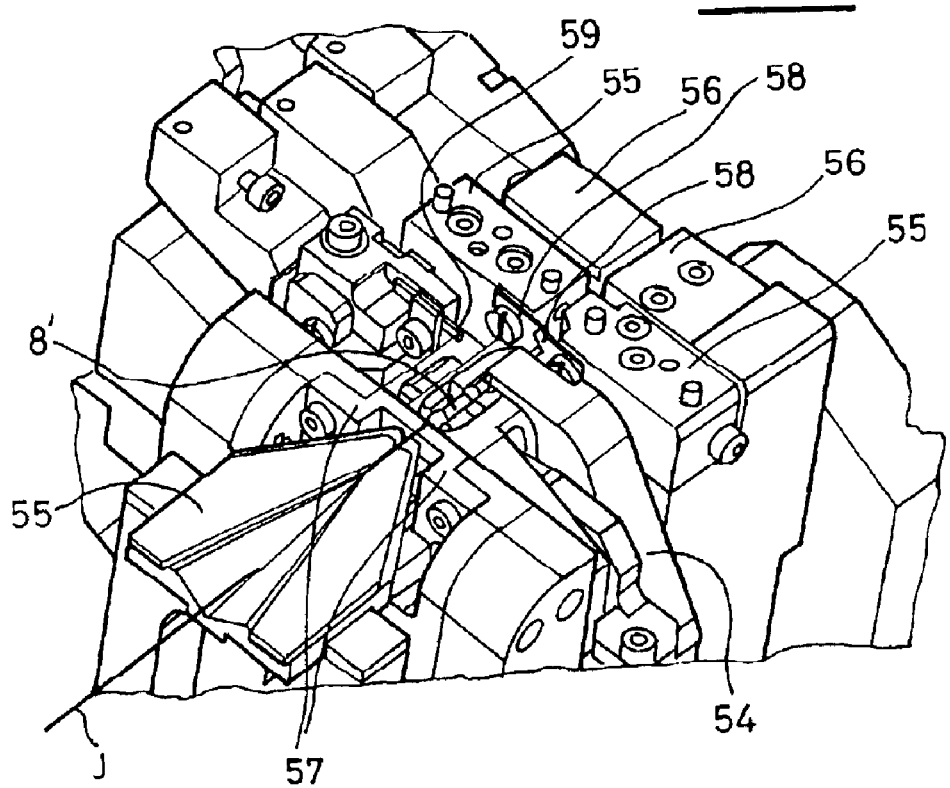
FIG_13
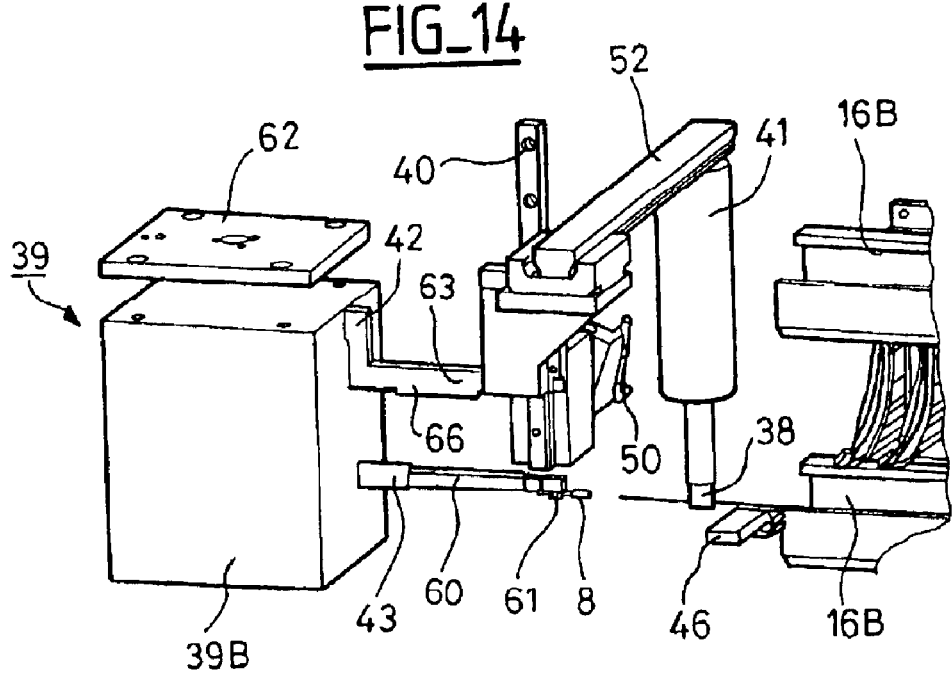
FIG_14

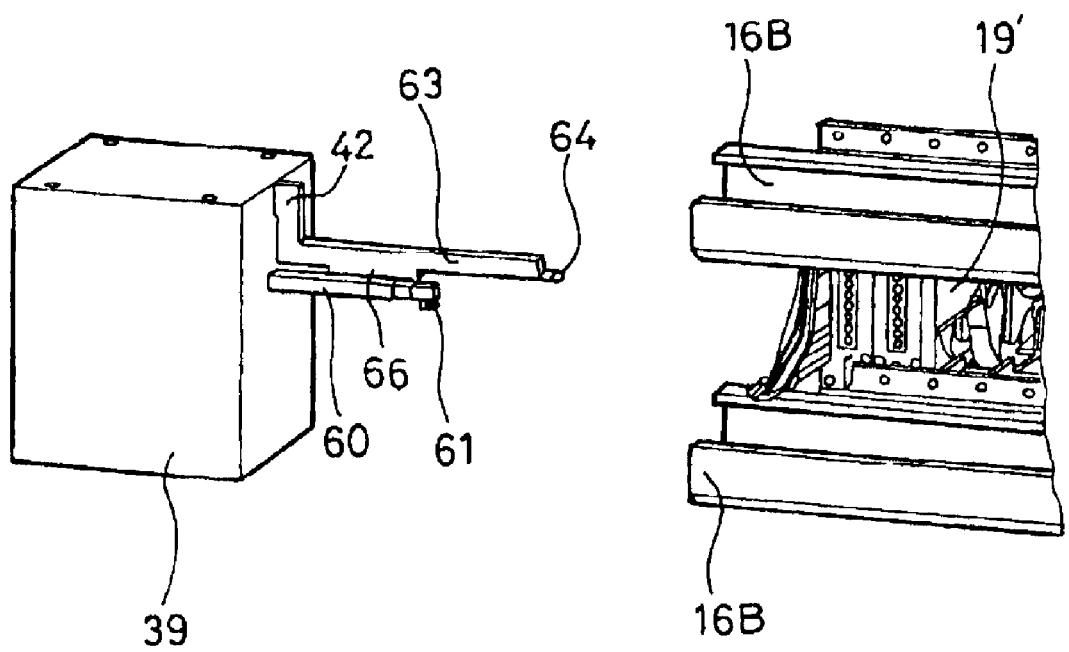
FIG_15

FIG_16
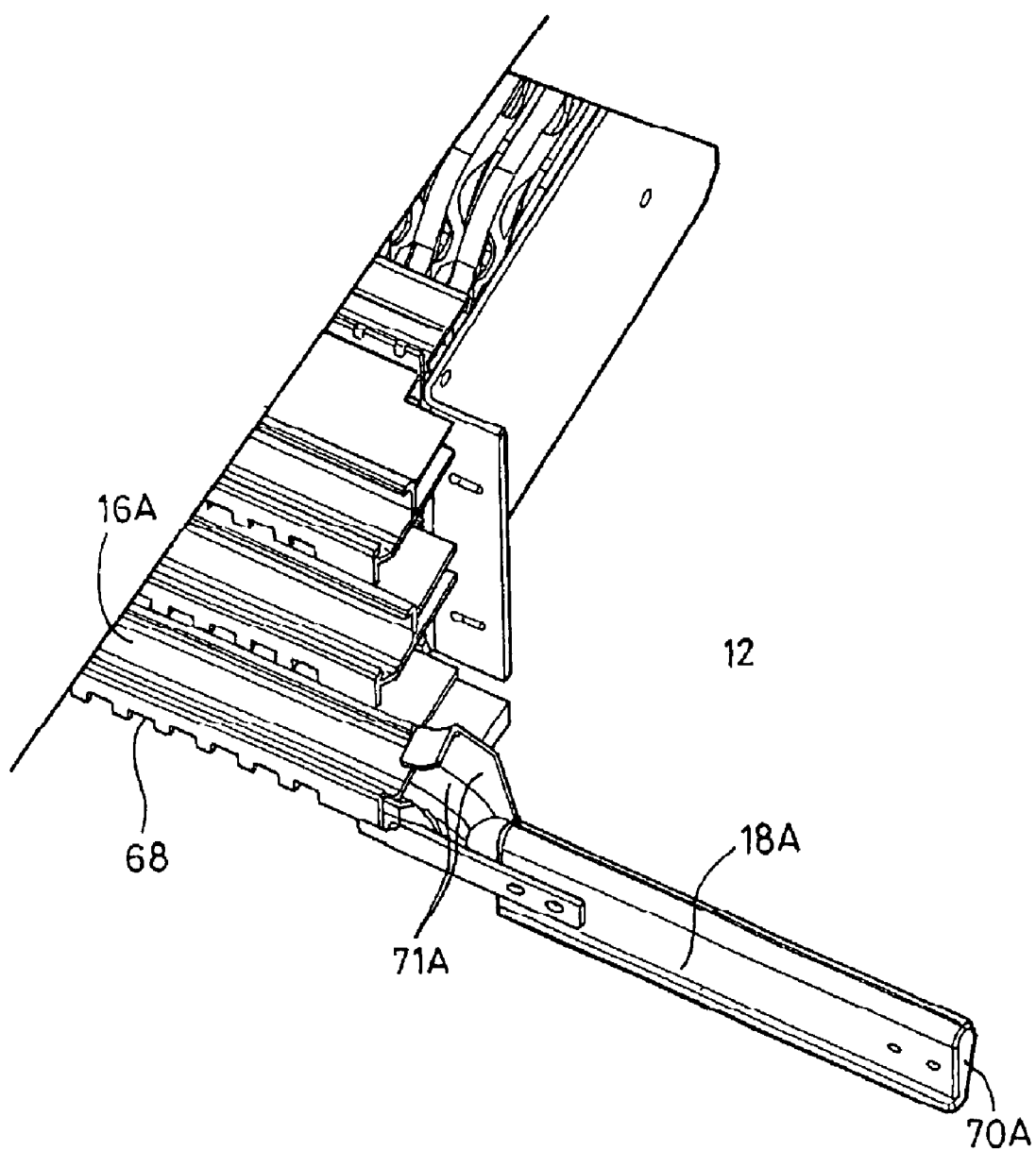

OPTICAL HIGH-DENSITY DISTRIBUTION FRAME AND METHOD FOR MAKING JUMPER CONNECTIONS IN SUCH A DISTRIBUTION FRAME

BACKGROUND OF THE INVENTION

1. Field of the Invention

The invention relates to an optical distribution frame, more particularly intended for allowing interconnections which are made selectively between optical fiber links in a telecommunication installation comprising a large number of these fiber links.

It also relates to a method intended for making jumper connections between fibers by means of which these interconnections are made, in an optical distribution frame having a high density of interconnection points, as envisioned above.

2. Description of the Prior Art

U.S. Pat. No. 5,497,444 describes one example of an optical distribution frame for use in telecommunication installations. It is shown in FIG. 1 and has a rectangular framework 1 which carries a series of horizontal supports 2 on which are placed modules 3 which are arranged on the supports so that they constitute two parallel vertical subassemblies. Each module is designed to accommodate a plurality of connectors, each connector being adapted to interconnect two fibers, one of which is used as a jumper. This kind of interconnection of two fibers is effected by means of two connection members each of which is fitted to the end of a fiber and which are placed opposite each other at a connector. The fiber connection members serving as jumpers are placed in front of the connectors in the distribution frame and the connection members of the other fibers that they interconnect are placed behind them. Support and guide members are provided for organizing the passage of the jumpers between the connectors, allowing for future reorganization requirements, and in FIG. 1 are represented by split rings 4 and troughs 5.

For reasons of orderliness and safety, the jumpers generally either run horizontally in horizontal troughs, and in particular in troughs associated with the horizontal supports of the modules, or vertically, to be more specific in split rings defining a vertical guide at each widthwise end of the distribution frame. For reasons of standardization, the optical jumpers, which are usually manufactured in a factory, are generally of a particular length sufficient to connect the farthest apart connection members of the distribution frame, and the jumpers connecting connection members that are less far apart must be coiled up in order to accommodate their excess length within the distribution frame. They are accommodated inside or in the vicinity of the vertical guides, for example, and specific provision must therefore be made for this.

This kind of solution was initially developed for jumpers consisting of electrical wires, and is not satisfactory if the distribution frame to be produced is a high-density distribution frame with a very high capacity, involving the fitting of a very large number of optical jumpers, for example ten thousand or more, which may be fragile and which must therefore be protected from damage, in particular during reorganization.

It therefore becomes preferable to provide an automated means of fitting the jumpers, as envisaged in French patent 2648300 when the number of jumpers to be fitted is of the order of that given as the example above and when, in consequence, the management of the excess lengths and the manual interventions to be made in a high-density environment of connection members become predominant aspects.

U.S. Pat. No. 6,157,766 discloses a high-density optical distribution frame for selectively interconnecting optical fiber links by means of jumpers which also consist of optical fibers within the context of a telecommunication installation.

This distribution frame comprises two vertical racks, the connection areas of which are lateral, facing one another, and which are separated from one another by an area for housing jumpers, these jumpers connecting the connection areas of each rack. The connection areas can pivot about a lower lateral horizontal shaft.

Such a distribution frame poses the following essential technical problem: it is very bulky.

This is because firstly the jumpers are precut to a fixed length and must be stored in a magazine (not shown in that document). Such a magazine may have a volume equivalent to that of the distribution frame.

Next, given the length and the admissible curvature of the jumpers, the area receiving them must be relatively wide, thereby further increasing the overall size of such a type of distribution frame.

Another technical problem relates to the fact that the connection areas can move and consequently the optical fibers are displaced during connections. This may cause interference in the telecommunications.

SUMMARY OF THE INVENTION

The invention solves these problems and to do so it provides a high-density optical distribution frame for selectively interconnecting optical fiber links by means of jumpers, which also consist of optical fibers, within the context of a telecommunication installation in which firstly the distribution frame comprises sockets (6), which are arranged in rows on parallel support members in a two-dimensional matrix structure and which are provided with individual connection members (8) for the links, and in which secondly each individual connection member of a socket is designed to cooperate with a complementary connection member with which the end of a jumper is equipped, which complementary connection member is placed on the front face of the socket, the distribution frame comprising one or more distribution racks (11A, 11B) on one side of which is provided an area (12) for the jumpers to run, the latter being fitted with plug-in connection members (8') on each of their ends so as to each connect an individual junction member of a socket carried by a support member to another individual junction member of another socket carried by another support member, in which distribution frame the socket supports are mounted on the front face of the distribution rack (11A, 11B), the cross-connect area (12) being open toward the front in order to receive the jumpers during the process of making jumper connections which is carried out by a robotized set of specialized tools (33), which is capable of acting, being moved and positioned with respect to the sockets so as:

to mount a plug on one end of a coiled optical jumper reserve, used for constituting the jumpers;

to position this plug in a first individual connection member of a given socket of a rack;

to fit the jumper uncoiled from this first given individual connection member, and through the cross-connect area, as far as a second given individual connection member of another socket;

to adjust the length of the uncoiled jumper and to cut it, converting it into a section separated from the rest of the still coiled jumper;

to fit a plug on the cut end of the uncoiled jumper section; and to position the newly mounted plug on the end of the section in the second connection member.

The invention also provides a method for making jumper connections for an optical distribution frame, allowing selective interconnection of optical fiber links by means of jumpers, which also consist of optical fibers, within the context of a telecommunication installation, in which the distribution frame comprises sockets, which are arranged in rows, on parallel support members on the front face of one or more distribution racks defining a two-dimensional matrix structure, and which are provided with individual connection members for the links. Each individual connection member of a socket is designed to cooperate with a complementary plug-in connection member with which the end of a jumper is fitted, which complementary connection member is placed on the front face of the socket.

According to one feature of the method according to the invention, a jumper is placed between two individual connection members belonging to different sockets of the distribution frame by means of a robotized set of specialized tools which carries out the following succession of operations:

mounting of a plug on one end of a coiled optical jumper reserve used to form the jumpers;

positioning of this plug in a first individual connection member of a given socket of a rack;

fitting of the jumper fiber uncoiled from this first given individual connection member as far as a second given individual connection member of another socket;

adjustment of the length and cutting of the uncoiled jumper in order to convert it into a section separated from the still coiled jumper reserve;

fitting of a plug on one end of the uncoiled jumper section; and positioning of the newly mounted plug on the end of the section in the second connection member.

According to one feature of the method according to the invention, provision is made for removing jumpers by:

withdrawing one of the plugs of the jumper to be removed by means of the plug handling tool after this tool has been positioned in the individual connection member where the plug to be withdrawn is located;

separating the withdrawn plug from the end of the jumper where it was placed, by breaking the jumper near this end by means of the plug handling tool;

withdrawing the second plug from the jumper to be removed by means of the plug handling tool after this tool has been positioned in the individual member where the second plug to be withdrawn is located; and pulling on the pinched fiber from the second plug in order to extract this fiber by a movement tending to make it slide along the path along which it was extended and out of the cross-connect area through which it passed.

The invention, its features and its advantages are explained in the following description with reference to the figures referred to below.

BRIEF DESCRIPTION OF THE DRAWINGS

FIG. 1 corresponds to a perspective view of the prior art optical distribution frame briefly described hereinabove.

FIG. 2 shows one example of a prior art connecting socket and a plug, as envisaged in a distribution frame according to the invention.

FIG. 3 is a front view of an optical distribution frame according to the invention.

FIG. 4 is a right-hand side view of the optical distribution frame shown in FIG. 2.

FIG. 5 is a partial perspective view of a detail of construction relating to the distribution frame shown in FIGS. 3 and 4.

FIGS. 6 and 7 are respectively a perspective view and a plan view of one example of a support arm for a connecting socket of an optical distribution frame according to the invention.

FIG. 8 is a perspective view of a fiber cassette of an optical distribution frame according to the invention.

FIG. 9 shows a simplified diagram relating to a robotized set of specialized tools for making jumper connections according to the invention.

FIG. 10 shows a simplified diagram of a fiber storage and delivery tool for a set of tools according to the invention.

FIGS. 11 and 12 show a schematic example of a fiber-handling tool composed of two subassemblies, each shown in two of the positions intended for them, during use.

FIG. 13 shows a partial plan view of a tool for mounting a fiber on a plug.

FIG. 14 shows a plug handling tool, a fiber-handling tool and part of the distribution frame, including two ends of adjacent troughs, the tools being in a position allowing a jumper to be inserted into a plug, in the case of one jumper, of fiber type, in place in one of the troughs.

FIG. 15 shows a fiber-handling tool in combination with that part of the distribution frame including two ends of adjacent troughs which is also shown in FIG. 14.

FIG. 16 shows a detailed partial view of an end part of the distribution frame, comprising troughs and the various jumper guides with which they are associated.

DETAILED DESCRIPTION OF THE PREFERRED EMBODIMENT

FIG. 2 shows one example of a multipoint optical socket 6 which can be pre-assembled. This socket is provided for individually connecting a given number of jumpers J, which consist of a single optical fiber in this example, to a corresponding number of optical fibers F, usually coming from the same distribution or transmission cable of an installation. The jumpers and the fibers to which they are connected are fitted with complementary individual connection members. In the embodiment shown here, the jumpers are equipped with individual male plugs, such as the rectilinear tubular plug 8' fitted to the end of a section of jumper J in FIG. 2, while the fibers to which these plugs must be connected are fitted with complementary connection members 8, which here are aligned, and which open onto a front face 9 of the socket, as can also be seen in FIG. 2. For example, a socket connects optical fibers which are part of the same group 7, for example a group 7 comprising eight fibers from a cable. Each connection member 8 is adapted to receive on the one hand a fiber, for example from a cable, and on the other hand a plug terminating a jumper fiber, the two fibers being placed end-to-end with respect to each other. The connection plugs are tubular plugs, for example, each designed to be traversed longitudinally by a jumper fiber. The fiber is terminated at a plug-in end of the plug that it traverses and in which it is immobilized. It is immobilized by crimping it, for example. The plug-in end is adapted, in a manner that is known in the art, to locate in a conduit formed for it in a complementary connection member 8, and can be elastically retained in position in that member, after plugging it in, should this be deemed preferable. In a preferred embodiment of the invention, each socket has one or more (preferably two) positions marks 0, 0', which in this example consist of two vertically aligned holes, considering the front face of the socket to be in a vertical reference plane.

Using jumpers different from those referred to above can of course be envisaged in the context of a distribution frame according to the invention, for example jumpers consisting of cables comprising a plurality of fibers, fibers with loose or tight isolation, or multifiber ribbons. Appropriate plugs and sockets are then provided. They are known to the person skilled in the art and are not described in detail here.

To simplify the description, the jumpers referred to in the remainder of the description are each considered to consist of a single optical fiber. It must nevertheless be understood that the invention relates to a method of providing jumpers and to distribution frames that can be used with jumpers of different types, as indicated above.

FIGS. 3 and 4 show one non-limiting example of an optical distribution frame in accordance with the invention for use in a telecommunication installation. It has a high capacity and a high density of connection members or points, and includes one or more aligned distribution racks, here two such racks 11A and 11B, each of which includes a set of sockets, as described above. These sockets are for selectively interconnecting fibers of distribution or transmission cables that terminate at the distribution frame, this interconnection being made by means of jumpers whose ends are fitted with plugs compatible with the connection members of the sockets.

In the example offered here, the two racks 11A, 11B are separated from each other by a cross-connect area 12 for running jumpers connecting the sockets of one of the racks to those of the other rack, the racks usually being dedicated, for example one to outgoing links and the other to incoming links. If there are more than two racks, it is of course possible to provide for running jumpers either across a single cross-connect area between two of the racks or in distributed areas, each lying between two racks, if necessary. It must also be understood that, in a distribution frame comprising only one rack, it is possible to provide a cross-connect area for running jumpers vertically on one or both sides of the rack.

The sockets are of the type shown in FIG. 2 and are assembled by rows into matrix structures in which their front faces are preferably coplanar. Marker means are provided to show the position of each socket in the set consisting of all the sockets of the distribution frame and the position of each connection point belonging to one of these sockets and corresponding to an individual connection member.

As shown also in FIG. 3, the sockets are arranged in parallel horizontal rows that are preferably aligned from one rack to another if there is more than one rack and which, in the example shown, are identically referenced 10A or 10B, according to the rack that accommodates them. The sockets 6 are mounted on horizontal sections that each rack has on a front face, two of these sections 13A and 13B being shown with no sockets in FIG. 3. The parallel rows of sockets are interrupted at the cross-connect area 12 between the adjacent racks.

The means for marking the positions of the sockets in the distribution frame comprise, for example, openings that are spaced regularly at the pitch of the sockets on the horizontal sections on which these sockets are mounted, or possibly on members of the distribution frame that are fixedly associated with those sections, for example horizontal troughs individually associated with these sections. These marker means comprise holes 67 formed at regular intervals in the sections or the troughs, for example, as shown for the sections 13B or the troughs 16B in FIG. 5. They can also take the form of regular notches 68 along these sections or troughs, as shown in FIG. 16, or consist of optical marks, for example optical patterns or bar codes.

Connecting the fibers from the various distribution and transmission cables to the sockets 6 involves using dedicated hardware means that here are organized into connection and distribution modules. These modules take the form of cassettes individually articulated to individual support members which here take the form of arms. They are accommodated in the interior volume of each rack so that the sockets they carry have their front faces coplanar. The interior volumes specific to the racks are delimited by the framework of beams serving as support and connecting members of the distribution frame, such as the vertical beams 14 and horizontal beams 15 of the racks 11A and 11B (see FIGS. 3 and 4). In the embodiment envisaged here, the sections 13A and 13B that support the rows of sockets are fixed to the vertical beams 14 around the front face of the rack that includes them. A horizontal trough is associated with each row of sockets, these troughs of the various rows in FIG. 3 being identically referenced 16A or 16B, depending on the rack 11A or 11B to which they are fitted.

Each of these troughs 16A or 16B is intended to receive the optical fibers constituting the jumpers that are connected to the connection members 8 of the sockets 6 whose compartments are situated immediately above, as shown in FIG. 5 for one of the troughs 16B. Jumper-guide members 17 are fixed to the sections supporting the sockets so as to run from top to bottom along the compartments of the connection members 8 of each socket 6, above each horizontal trough. These members are adapted to guide each jumper between the trough in which it rests and one of the compartments of a socket situated immediately above that trough. These jumper-guide members 17 are designed to facilitate depositing jumpers in the troughs and adjusting their length and tension, avoiding adjacent jumpers crossing over in them. Here they are slightly curved to guide the fibers that run in them in the horizontal trough that they overlie and toward the cross-connect area 12 which is located at the center of the distribution frame in the embodiment shown. The cross-connect area 12 provided between adjacent racks, such as the racks 11A and 11B, here has dimensions providing a passage for all of the jumpers that can be fitted, each connecting one connection member 8 of a socket 6 of a rack to a connection member of a socket of the other rack. This is possible regardless of the respective positions of the members, the sockets that incorporate them, and the troughs associated with these sockets in the racks.

If two connection members that are part of sockets at different heights in the two racks that include them are connected by a jumper, the latter runs from the vertical level of the trough that serves one of the sockets to that of the trough that serves the other one in a cross-connect area 12. The jumpers crossing a cross-connect area 12 are held in a particular position within that area 12 by general guides, such as the guides 18A and 18B, for retaining and protecting the jumpers. Here these general guides take the form of elongate members forming arms carried by adjacent racks and partially closing off the cross-connect area 12, leaving a vertical passage centrally between them for introducing fibers into the area, as can be seen in FIG. 3 in the case of the embodiment described here.

Here the general guides are associated in pairs, the two general guides of a pair being mounted at the same vertical level on respective opposites sides of a cross-connect area 12 between two adjacent racks. In the embodiment shown in FIG. 5, the two general guides 18B shown are each situated in the extension of the front edge of a trough 16B. They are designed to retain jumpers in the cross-connect area 12 running vertically at their respective levels and which pass through troughs of the rack incorporating the trough in the extension of which each of them is respectively situated. Closure plates 69 carried by beams of the framework of the distribution frame limit the cross-connect area 12 behind the general guides, as shown in FIG. 3.

In a preferred embodiment more particularly illustrated in FIG. 16, the arms forming the general guides, like that forming the general guide 18A, are designed to facilitate the appropriate fitting of jumpers during the phase of making jumper connections and keeping them in place after being fitted. For this purpose, the jumpers are brought into contact with a longitudinal shaped piece 70A made on the general guide part oriented toward the inside of the cross-connect area made between racks in the embodiment shown. This longitudinal shaped piece serves for momentarily pushing back the jumpers rearward during the installation phase. Continuity is achieved between the end of a trough, such as one of the troughs 16A in FIG. 16, which emerges at the cross-connect area and the general guide 18A associated with this trough, by means of a guide strand, such as 71A, responsible for guiding the jumpers from a trough relative to the general guide associated with this trough in the cross-connect area 12. Each guide strand permanently supports the jumpers at the inlet of the trough along the extension of which it is placed.

As indicated above, in the embodiment envisaged here, the sockets 6 are carried by individual support arms fixed side-by-side to the horizontal sections, like the support arms 19 and 19' that can be seen partly in FIG. 5, and one of which is shown in detail in FIG. 6. Each of these support arms includes a housing open at one end which is adapted to enable it to receive a socket, and here the support arms are fixed to the horizontal sections of the socket support, as shown in FIG. 5 in the case of the arms 19, 19'. The sections like the sections 13A, 13B are designed to allow positioning of the arms and therefore of the sockets, as symbolized by ribs 20 shown on the two sections 13B at the top in FIG. 5.

FIGS. 6 and 7 show one embodiment of a support arm 19 which, as indicated above, includes a central housing 21 at a first end to receive a socket 6 which is accurately positioned therein so that the front face and the compartments of the connection members of this socket are in predetermined positions. If a jumper connection between connection members of different sockets is automated, it is necessary to provide means for positioning the plugs that terminate the jumpers in the conduits of the connection members 8 into which those plugs must be inserted.

In the proposed embodiment, means are provided at the end of a support arm which includes a central housing 21 that cooperates with complementary means provided on a device by means of which a plug is located in front of the connection member compartment 8 into which it must be inserted. In the embodiment described, the means provided at the end of a support arm are hollow shapes adapted to receive complementary solid shapes, these shapes being chosen to achieve the positioning accuracy necessary for inserting a plug in the connection position into a conduit of a connection member whose position in the distribution frame has been predetermined. In a first embodiment, the means provided at the end of a support arm take the form of cylindrical cavities 22A at the first end of each arm and each extended laterally by a slot 22B with a particular orientation. The socket 6 is immobilized in the arm in a particular position, this position being confirmed by a polarizer 22C provided inside the arm and adapted to penetrate one of the holes 0 or 0' constituting the positioning marks of a socket 6 when this socket is in the position provided for it in the arm, the hole to be used being predetermined.

In the embodiment shown, there are four cylindrical cavities 22A disposed around the opening of the housing 21 provided for a socket 6 at the first end of a support arm 19. These cavities 22A are connected in pairs by a slot 22B that is common to them and is oriented parallel to the alignment axis of the compartments of the connection members 8 of the socket 6 housed in the arm shown. A centering rod, which is preferably cylindrical and whose diameter then corresponds to that of a cavity 22A, serves as the complementary solid shape for the device for positioning a plug. This centering rod, not shown, is extended laterally by a projecting portion whose dimensions correspond to those of a slot 22B in which it locates when the rod that carries it is in a cavity 22A, to provide a precise indication as to the position of the device it equips. Here there are four cylindrical cavities 22A and two slots 22B for each support arm.

In a second embodiment, the plug positioning device can be accurately positioned relative to one of the cylindrical cavities 22A disposed around the opening of the housing 21 of a support arm 19. To this end, the positioning device is displaced mechanically to a predetermined position relative to the distribution frame, or to be more precise relative to a connection member 8 of a socket 6 accurately positioned in one of the racks of the distribution frame. The penetration of the centering rod of the plug positioning device into a particular cylindrical cavity 22A can then serve, incidentally, to pre-position the tool of the device used to insert a plug into the conduit of a particular connection member 8 of a particular socket 6. The tool is then designed so that the plug has some facility for accommodation and relative freedom of lateral movement on insertion. This facility is provided by one or more springs where the tool is fixed to the device that carries it, for example.

In the embodiment envisaged here, the arm is bent twice in opposite directions halfway or approximately halfway along its length and in two dimensions, as shown in FIGS. 6 and 7, so that its two ends are offset relative to each other, this arrangement being adapted to allow high-density mounting of the arms 19, 19', the sockets 6 and the cassettes 23 for coiling up the fibers constituting the jumpers in a distribution frame, as shown in FIG. 5.

In a preferred embodiment, the first end of an arm cooperates with two immediately adjacent support sections of a rack between which it plugs in. To this end, it includes two positioning slots 25 adapted to slide on facing ribs 20 at the same horizontal level on the support sections between which the first end of the arm is inserted, the slots being shown in FIGS. 6 and 7 and the ribs being shown in FIG. 5.

The second end of an arm includes an articulation member 26 which here comprises a lateral shaft adapted to be horizontal when the arm is in place in a distribution frame. This articulation member 26 is intended to serve as a support for a cassette, as briefly mentioned above, which to this end includes a complementary articulation member, here of the shaft clip kind, as can be seen in FIG. 8.

The double-bend structure that joins the two ends of an arm takes the form of a hollow body delimiting a U-shaped lateral passage that terminates in the housing 20 of a socket 6 at one end and in an extension of the bottom of the U-shape that carries the articulation member shaft 26. This lateral passage is provided for the group 7 of fibers that connect the connection members of a socket 6 to a cassette. Here it is provided with a labyrinth consisting of retaining lugs 27 extending above the bottom of the passage, from the two flanks of which these lugs project alternately from one flank toward the other, to retain the fibers in the passage after they have been inserted therein. In a preferred embodiment, the dimension of the end of the arm, and here of its front face, in a direction parallel to the sections 13B between which it is positioned is made to be twice the width L of the other parts of the arm and the cassette in the same direction. This arrangement represents an improvement in terms of the socket density in that it provides for alternating structures belonging to support arms on which are mounted sockets 6 disposed in two immediately adjacent rows, when the sockets of those rows are fixed above and below the same section 13A or 13B inserted between them, the corresponding arms having their respective articulation members 26 alternately above and below the sockets that the arm carries when the sockets are in position in the distribution frame. In the embodiment shown, this alternation is also reflected in alternating orientations of the passages and the articulation members of the alternate support arms with respect to two rows of immediately adjacent sockets. The respective articulation shafts 26 of the various arms mounted on either side of the same section are then all aligned and face each other in pairs.

FIG. 8 shows a preferred embodiment of a cassette 23 for the fibers of a bundle, which cassette is usually molded from an insulative material to form an open module with a flat bottom which here is symmetrical with respect to a transverse mid-plane XX. This module is closed, more particularly when the cassettes are in the normal position in the distribution frame, by the bottom of an identical or similar module pressed against it. The proposed cassette is approximately rectangular in that it has two symmetrically rounded corners on one of its two long sides and two projecting shaft clips 28, 28' symmetrical with respect to the transverse mid-plane XX on its second long side. Its overall thickness is equal to the width L of the arm previously referred to, and so it is possible to stack along a support section and over the same lengthwise distance a number of cassettes corresponding to the number of alternate support arms and thus to the number of sockets carried by those arms, with these sockets alternately above and below the section concerned, as shown in FIG. 5.

The clips 28, 28' of a cassette are designed to clip onto an articulation member shaft 26 on a support arm 19 to fasten together this arm and the cassette. Each symmetrical C-shaped gripper is adapted to clip elastically around a support arm articulation member shaft 26 to allow subsequent rotation of the cassette about this shaft and to allow the cassette to be detached from the support arm by pulling on the cassette. The presence of a clip 28 or 28' at each end of a cassette is not essential, but has the advantage that the cassettes can be aligned so that they all have their open sides oriented in the same chosen direction when they are mounted on support arms whose articulation member shafts are aligned. One direction is then defined by the cassettes mounted with each of their respective clips 28 around one of the aligned shafts, while the other direction is alternately defined when the cassettes have each of their respective clips 28' around one of the aligned shafts.

In the embodiment shown in FIG. 5, the aligned cassettes represented are articulated to the support arms 19, 19' by their respective clips 28 and the bottom of one closes off the open side of the next one. These aligned cassettes are alternately carried by support arms whose respective articulation members 26, not shown in FIG. 5, are positioned below the sockets 6 that they carry, in the distribution frame, and by support arms whose respective articulation members 26 are above the sockets 6 that they carry. A cassette is accommodated either above a support arm against which it is pressed through whichever of its short sides carries the clip by which it is articulated to the arm, when the latter has its articulation member above the socket 6 that it includes, and when it is in place in the distribution frame. Alternatively a cassette is cradled in the hollow of the bend near the articulation member of the support arm to which it is articulated when that arm has its articulation member below the socket 6 that it incorporates, and when it is in place in the distribution frame. The dimensions chosen for the component parts of the support arms and the cassettes that have to cooperate, when the arms are in place in the distribution frame and the cassettes are associated with them, are therefore chosen in a manner known per se so that the cassettes of one row are stowed in the same manner whereas the support arms that carry them are disposed in accordance with the alternating arrangement defined above. Articulating a cassette to a support arm fixed in a distribution frame allows it to be moved between positions that correspond to a normal position in which it is inserted between two other cassettes, with which it is then aligned, those cassettes being carried by distributor frame arms mounted differently from that to which it is articulated, and a position convenient for working on it, in which it is virtually totally withdrawn from the row of cassettes in which it is normally incorporated.

Moreover, each cassette 23 incorporates coiling structures 24 designed to receive optical fibers (see FIG. 8). For the same cassette, these optical fibers include fibers belonging to a group of fibers to be distributed coming from a distribution or transmission cable and intermediate fibers for connecting the previously mentioned fibers to the individual connection members 8 of the socket 6 carried by the support arm to which the cassette is articulated. The structures 20 of a cassette for coiling up the fibers are formed by internal walls projecting from the bottom of this cassette and disposed to prevent any risk of breaking the lengths of optical fiber to be coiled up in the cassette. This is known in the art.

Two separate conduits are provided to enable the fibers of a group and the intermediate connecting fibers to enter a cassette in the area where this cassette is articulated to the articulation member 26 of the support arm that carries it. In the embodiment shown, in which the cassette is symmetrical with respect to a mid-plane, two conduits 29 and 30 or 29' and 30' open laterally at the ends of the cassette, on the short sides of this cassette and on respective opposite sides of each of the shaft clips 28 or 28', only the passages near the shaft clip by means of which the cassette is carried by a support arm being used.

The conduits 29 and 29' of a cassette are designed to allow the fibers of a group to penetrate into the cassette in order for each to be connected therein to an intermediate connecting fiber by means of splices, not shown.

The conduit through which the fibers of a group penetrate into a cassette is provided with an auxiliary device for immobilizing the fibers. This auxiliary immobilizing device is, for example, a clip-on stowage bracket as described with reference to FIG. 4 of French patent application 2789497, adapted to immobilize at least one protective tubular sheath in which the whole or part of a group of fibers as referred to above is placed.

The conduits 30 and 30' of a cassette are designed to allow the intermediate connecting fibers accommodated in the U-shaped passage of a support arm to penetrate into a cassette 23 articulated to that arm by one of its shaft clips, via the conduit near that clip, with no risk of bending and therefore of breaking, despite rotation of the cassette about the axis of the articulation member of the support arm that carries it. Here this rotation is possible between the normal position and a limit working position that is mechanically fixed by a portion of the cassette abutting against a portion of the arm to which this cassette is articulated.

In the proposed embodiment, the input/output fibers and the intermediate connecting fibers that are interconnected in a cassette enter via passages 29 and 30 or 29' and 30' reserved for them on respective opposite sides of the same shaft clip 28 or 28' of the cassette. The conduit 30 or 30' through which the intermediate connecting fibers enter is disposed so as to open out along the extension carrying the articulation member 26 or 26' of the support arm against which the cassette is pressed when the latter is in the normal position. To this end, the extension leaves an empty space around the articulation member that it carries, through which empty space fibers can be passed when a cassette is mounted on that member.

A fiber of a group can be spliced to an intermediate connecting fiber by various means whose external shape is usually tubular and which are conventionally retained in position in the cassette by a stack of elastic tongues 31 between which the various splices between fibers are immobilized. This is known in the art. The retention of the fiber sections contained in a cassette is conventionally complemented by retaining lugs 32 projecting from the walls of the cassette parallel to its bottom so as to cover partly the portions of this cassette containing the coiled up fibers.

One or more of the sockets 6 in two or more of the racks, such as the racks 11A and 11B in FIG. 3, are initially fitted before any jumper connections are made in the distribution frame that includes these racks. Because the number of sockets in this kind of distribution frame is particularly high, there is provision for making the jumper connections automatically, using a robotized set of specialized tools 33 able to move in front of the racks of the distribution frame to enable the members to intervene in the context of the operations necessary to make the jumper connections and to modify them over time for each of the connection points of the sockets 6 disposed on the front face of the racks.

Here the set of tools 33 moves in two directions in a plane parallel to the reference plane defined by the front faces of the sockets at the front of the racks. For example, it is mobile in translation on a vertical support 34 which is itself mobile in translation in the horizontal direction, and therefore includes displacement means, which are motor-driven and controlled by programmed control logic, not shown, able to supervise the operations of making and modifying jumper connections referred to above for the whole of the distribution frame. Horizontal movements of the vertical support 34 are guided by rails 35 respectively disposed at the top and at the bottom of the distribution frame and parallel to the reference plane defined above, for example (see FIGS. 3 and 4).

The robotized set of specialized tools 33 for making jumper connections, shown in FIG. 9, is housed in a metal framework 44, in the form of a rectangular frame, which is arranged vertically so as to be able to be moved in front of the front faces of the racks where the front faces of the sockets appear, under the conditions indicated above. It is placed under the control of the programmed control logic, which is not explained in detail here, and essentially comprises:

a storage/delivery tool serving as an optical fiber jumper reserve, shown symbolically by a coil 45;

a device for storing fiber end plugs (this device not being shown here);

a multifunction tool 36 for connecting a plug to a fiber, designed to carry out the various operations needed for mounting a plug on one end of a fiber and in particular for adjusting the length of the fiber and for cutting it;

a fiber-handling tool, composed of two subassemblies respectively responsible for distributing the fiber in a defined manner during the various operations associated with making jumper connections and gripping it, more particularly near one end, in order to orient and/or position this end in a predetermined manner; the first subassembly includes a moveable distribution head 37 fitted with a nozzle via which the fiber is delivered; the second subassembly has a gripper 38 which can move vertically and can rotate partly, which is used to grip the fiber and modify its position in space;

a plug handling tool 39 for gripping a plug and moving it, in particular during the phase of connecting a fiber fitted with such a plug to a given connection member that the distribution frame has, the connection operation taking place by insertion of the plug, mounted on one end of the fiber, into the connection member. The plug handling tool is also designed to allow disconnection operations which are to be carried out in the case of withdrawal of a jumper fiber fitted previously.

The multifunction tool 36 is, for example of the kind disclosed in French patent application filed under the number 96/16188, which is especially designed for cutting and stripping an optical jumper fiber.

In the set of specialized tools 33 provided, the plug-to-fiber connection tool 36 and the plug handling tool 39 are intended to be placed at the bottom of the framework 44 so that each can move from one of the two longitudinal ends of this moving framework toward its central part.

These tools are, for example, each carried by a different support plate, the two support plates (not shown) moving along a common track composed of longitudinal support rails, as shown symbolically by the arrows in FIG. 9.

A longitudinal displacement of the connection tool 36 and of the plug handling tool 39 allow these tools to move closer toward or further away from the central part of the framework 44 where the two subassemblies of the fiber-handling tool are located, these being seen one in front of the other in FIG. 9.

The subassembly fitted with the distribution head 37 has a carrier arm 40 which is held by a device allowing it to move in two directions, one vertical and the other horizontal, with respect to the framework 33, to the top central part of which the arm is attached. The horizontal displacement takes place perpendicular to the plane of the figure, as shown symbolically by the tip and the tail of arrows, shown below the distribution head 37 in FIG. 9. This plane of the figure corresponds to the plane of displacement of the framework, which is parallel to the reference plane defined above.

Vertical displacement of the carrier arm 40 is represented by that of the moveable distribution head 37 with respect to the framework 44, in the embodiment shown. These two combined displacements of the arm and of the head are shown symbolically here by the vertical arrowing on the right-hand side of the moveable head in FIG. 9. Alternatively, this moveable head can move with respect to a stationary carrier arm; this is mentioned here as a variant and will not be developed in the rest of the present description.

The distribution head 37 is also designed to partly rotate with respect to the support arm; this is symbolized by the curved arrows going around this head in FIG. 9.

The displacements of the support arm 40 and of the distribution head 37 take place on the other side of the subassembly including the gripper 38 with respect to the reference plane, when the framework 4 is fitted and is in place with respect to the racks of the distribution frame, as shown in FIGS. 3 and 4 in the case of the set of tools 33.

As indicated above, the second subassembly of the fiber-handling tool has a device constituting a gripper 38 designed to allow a jumper fiber to be gripped laterally. This gripper is positioned here on the lower end of a support member 41, allowing it to straddle, from above, the fiber to be gripped, while leaving the ends of the fiber free. The gripper 38 is controlled by servocontrol means designed to allow it to grip and release a fiber according to a given control program, in the phase during which the set of tools 33 is being used. The servocontrol means are, for example, of the pneumatic control type and are run by the control logic via an appropriate interface.

The support member 41 is held by a device (not shown in FIG. 9) which allows vertical displacement of the gripper 38 with respect to the framework through the top part of which the device is attached. The gripper 38 is designed to undergo servocontrolled partial rotation about a vertical axis, shown schematically by the curvilinear arrows present at the top of the support member in FIG. 9. The vertical displacements of the gripper are shown symbolically by the straight arrows on the left-hand side of this gripper 38. The partial rotation is designed here to change the orientation of the fiber by a right angle. Of course, in an alternative embodiment, it is conceivable to move the gripper both in rotation and in vertical translation either by direct servocontrolled action or possibly by servocontrolled action affecting the support member 41 on the end of which this gripper is mounted.

As indicated above, the plug handling tool 39 can move in longitudinal translation in the lower part of the framework, because it is mounted on a pneumatically servocontrolled support plate 39A. This support plate is, for example, surmounted by a subassembly 39B which includes a plug positioning tool 42 and a plug fitting tool 43. These two tools are mounted here laterally with respect to the assembly formed by the set of tools 39, the tool 42 being designed to allow the set of tools, and more particularly the plug holding tool 43, to be accurately positioned with respect to a socket. This accurate positioning is more particularly designed to allow a plug to be inserted into a connection member or possibly such a plug to be extracted from such a member.

For this purpose, the subassembly 39B is mounted and electrically servocontrolled so as to move, on the one hand, in transverse translation with respect to the direction of longitudinal displacement of the support plate 39A and, on the other hand, in rotation with respect to a vertical axis, as shown schematically by the arrow tip and the arrow tail located at the top at the right-hand side of the block representing the set of tools 39 and by the curvilinear arrows placed above this block. The rotation of the subassembly 39B with respect to a vertical axis is designed here to change the orientation of the block, and more precisely of the tools 42 and 43 of which it is composed. It is more particularly intended to change the orientation of the subassembly by $\Pi/2$.

In a preferred embodiment, the subassembly 39B is secured to the support plate 39A by a bell mounting allowing it to be held at the top and to benefit from the known advantages afforded by bell mountings, in terms of ease of displacement of the suspended part.

The positioning tool 42 has a rod 63 held horizontally, one end 64 of which is shaped, for example pointed, in order to make it easier for it to engage in a complementary opening, for example of the notch or hole type, provided in the distribution frame. Such engagement allows the sockets that the distribution frame has, and therefore their respective connection elements, to be physically marked in order to allow a plug to be inserted into one such member or conversely to be extracted therefrom. Alternatively, provision may be made for the sockets to be marked optically, for example by means of optical marks, as envisaged above and of an appropriate detector, for example a diode-type optical mark detector.

The plug holding tool 43 has an arm whose end is equipped to keep a plug horizontal, assumed to be straight, it being supposed here that the insertion of a plug into a connection member takes place horizontally, when the socket in question is in place in the distribution frame. In one embodiment, the end of the arm has a plug holding gripper 61 designed to straddle the plug and hold it, for example in its central part, so as to leave the ends of this plug free. The plug holding tool is designed to rotate about a horizontal axis, as shown schematically by the curvilinear arrows near the tool in FIG. 9.

The framework also carries the jumper fiber storage/delivery tool, and more particularly a coil 45 on which a reserve of jumper fiber is coiled. According to the invention, the coil is designed either to be partly uncoiled on the occasion of each jumper connection being made between any two connection members in order to deliver a length of fiber needed to make the jumper, depending on the path set for joining these two members. This uncoiled length of fiber corresponds to the length of jumper needed to connect the two connection members, without the fiber being under tension between them. A defined excess length, adjusted according to the requirements, is provided in order to allow fiber bends of suitable radius to be obtained, in particular for each of the two possible changes in level existing when the two sockets to be connected are not at the same horizontal level. In the example shown, the storage/delivery tool is placed in the top part of the framework in a position in which it can correctly feed the distribution head 37 with fiber during jumper connection operations.

Other members, especially accessories of the set of tools and of the programmed control logic supervising the jumper connection operations in the distribution frame, can also be carried by the framework. This relates in particular to various control members and, for example, some of the supervision circuits used by the programmed control logic and various devices, especially a gripper 46 for holding a fiber in position.

The holding gripper 46 is especially intended to be used in the course of placing a jumper fiber, along the defined path, in a manner programmed for such a fiber between the connection members that it must join together. This holding gripper is more particularly designed to hold a fiber at a chosen point downstream of the first connection member to which the fiber is connected, during the placing operation, which will allow this fiber to join the second connection member to which it has to be connected, via the troughs of the distribution frame.

A jumper is placed between two given connection members belonging to different sockets of the distribution frame by the series of operations described below.

A first operation consists in mounting a complementary plug of the connection member at one end of the jumper fiber.

As shown in FIG. 10 the jumper fiber J is stored on a coil 45 of the storage/delivery tool contained in the moveable framework 44. The coil 45 is preferably mounted on a shaft and designed to be able to rotate in both directions, under the action of a motor, so as to be able to deliver the fiber, by being paid out, or alternatively to be able to rewind it, when the operations associated with jumper connections so require.

A set of pulleys 47, 47' and 47" is in this case associated with the coil 45, the first two pulleys being used for the purpose of regulating the output and the pulley 47' serving as a control counterweight as per a well-known technique. The pulley 47" is preferably a motor-driven pulley provided with an encoder for measuring the length of fiber delivered. It is controlled by the abovementioned control logic so as to deliver, or alternately recover, the fiber depending on the distribution program involved during the operations associated with the jumper connections.

The fiber J delivered by the motor-driven pulley 47" is introduced into a flexible protective tube 49 in which the fiber runs or via which the fiber is conducted to the distribution head 37 of the fiber handling tool.

The two essential subassemblies of this fiber handling tool are illustrated together with a fiber holding gripper 46 in FIGS. 11 and 12, a small portion of a rack of the distribution frame being shown in FIG. 12.

This rack portion comprises two sections belonging to superposed troughs 16B, the front faces of two sockets carried by the support arms, such as 19', where the sockets are housed, and a first of the jumper guide members 17 associated with the two partially shown troughs 16B.

The first subassembly of the fiber handling tool has a moveable distribution head 37 presented in two different positions in FIGS. 11 and 12. This distribution head is fitted with a nozzle 50, at right angles here, one end of which is designed to be connected to the end of the protective tube 49 via which the jumper fiber is transmitted to it. In the embodiment illustrated, the second end of this nozzle 50 is placed so as to remain approximately horizontal during the jumper connection operations, whatever the position then adopted by the moveable distribution heat that carries The distribution head 37 is articulated to an intermediate member 51 which is, for example, a servocontrol module 51 for allowing the second end of the nozzle to be partially rotated with respect to an axis, assumed in this case to be horizontal. The purpose of this is to facilitate the operations of laying the jumper fiber along the path that this fiber follows in order to join the two connection members that it has to interconnect, this path following, in succession, two troughs belonging to different racks in the case of a multirack distribution frame. The orientation and the shape of the nozzle 50 are conventionally determined as regards running a wire or fiber, in order to allow a fiber to be optimally laid along the path that it travels between two connection members, particularly in the phase when a fiber is introduced into a trough.

The servocontrol module 51 is in this case fixed to the lower part of the abovementioned carrier arm 40, the upward displacements of which, between a high position used for certain operations, in particular when the tool 36 for mounting a plug on a fiber is used, and a low position used especially during the phase of laying the jumper fiber along the path between two connection elements, it follows. The high position makes it possible in particular for the plug mounting tool to be placed in the central part of the framework, when a plug is being mounted on one end of the fiber.

As indicated above, the vertical displacements of the distribution head 37 and of its nozzle 50 follow those of the support arm 40, to which this head is fixed, by means of its servocontrol module 51. In the example shown, the support arm 40 is attached beneath the ceiling, constituted by the top central part of the framework, by means of a device that allows this arm to move in two perpendicular directions. This device comprises a horizontal support rail 52 which is placed transversely with respect to the framework so as to allow the head to move from the front to the rear with respect to the reference plane, to which the support rail is perpendicular here. In the embodiment shown, the support arm is supported by a carriage 53 that slides beneath the support rail 52 to which this carriage is attached. The support arm 40 slides vertically with respect to the carriage which has an appropriate complementary structure 54. As already indicated, the various displacements envisaged above are servocontrolled, this servocontrol being obtained by known means, such as pneumatic cylinders and/or electrically motor-driven mechanisms.

The second subassembly of the fiber handling tool has a gripper 38 for gripping the fiber, comprising for example two parallel jaws arranged horizontally, between which a portion of fiber can be immobilized. The gripper 38 here is fixed beneath the ceiling, that the top central part of the framework constitutes, via a support system 41 allowing it to rotate through a right angle in two directions relative to a given central position. This rotation about a vertical axis is assumed here to be obtained by means of two superposed rotary members aligned along the vertical axis of rotation in the support system 41 of which they form part, as may be seen in FIGS. 11 and 12. The given central position is assumed here to be chosen so that the jaws of the gripper 38 are oriented parallel to the reference plane. One of the rotary members carries the gripper 38 and is located beneath the other, which is fixed to the ceiling of the framework; moreover, it slides along the abovementioned vertical axis in order to take the gripper from a high disengagement position to a low working position. The gripper 38 can move so as to be placed in front of the second end of the nozzle, when the latter is in a given position, so as to be able to straddle the jumper fiber which exits this second end and to immobilize the straddled part of the fiber, which is then located between its jaws. In the example shown, the gripper 38 is assumed to be in the low position, with its jaws perpendicular to the reference plane. The distribution head 37 is in the low position, near the low position of the gripper. The second end of the nozzle 50 is oriented perpendicular to the reference plane and consequently toward the gap then existing between the jaws of the gripper 38. The moving away of the first subassembly, comprising the distribution head and its nozzle, with respect to the reference plane, while a fiber leaving this nozzle is immobilized between the jaws of the gripper 38, results in an amount of fiber leaving the nozzle which depends on the displacement undertaken. In the embodiment shown, the displacement of the first subassembly is accompanied by the delivery of a suitable length of fiber by the fiber storage/delivery tool from the coil 45. The return of the gripper 38, by rotation, to its given central position, after a fiber has been immobilized between the jaws of the gripper, allows the gripped part of the fiber to adopt a direction parallel to the reference plane. The gripped part of the fiber may be any part or else it may correspond to the end section of fiber, if the gripping takes place at the end of an operating phase in which the subassemblies of the fiber handling tool are in the positions indicated above, in the context of the given example.

Mounting a plug, such as 8' in FIG. 2, on the end of an end section of fiber immobilized by the jaws of the gripper 38 means that the gripper is in a position for which the immobilized section is parallel to the reference plane.

This mounting operation is performed by the abovementioned tool 36 for mounting a fiber on a plug, which tool moves toward the center of the framework on this occasion. This allows the tools carried by the framework to act on the fiber so as to mount a plug thereon.

As is known, to mount a plug on a jumper fiber requires operations to be carried out, on the one hand, on the fiber and, on the other hand, on the plug. The purpose of these operations is in particular to partially remove the sheath surrounding the fiber and to shape the end of the fiber thus stripped, for the purpose of linking it to another fiber. Their purpose is also to position a plug on the fiber part whose end has been shaped and to fix it thereto. These various operations are carried out automatically by means of the tools making up the set of tools 36, which is a unit of the kind described in U.S. Pat. No. 5,999,682 which discloses a manual machine for automatically connecting two optical fibers end to end by means of a connection module. This machine combines a certain number of tools, and especially of fiber preparation tools, for example for the purposes of stripping and cutting a fiber, as well as of crimping the connection module, which may be reused with a minimum of adaptations in order to constitute an assembly for mounting a plug on a fiber, as envisaged in the present application.

FIG. 13 shows a top view of a plug mounting assembly. It is designed to allow a plug 8', of tubular shape, to be mounted on the end of a jumper fiber J so that this fiber passes through the plug from one end to the other and can be joined to another fiber in abutment in a complementary manner at the end of a connection member that one of the sockets of the distribution frame has. For this purpose, the plug 8' to be mounted is placed in a holding device 54, allowing the plug to be held so as to be able to slip a fiber into it. It is assumed that the plug 8' has a longitudinal conduit designed to receive a fiber.

The holding device 54 is, for example, provided with two recessed jaws which are pneumatically servocontrolled and which bear laterally on each side of the plug, along the length of the latter, one of these jaws being partly visible in FIG. 13.

The fiber held parallel to the reference plane by the gripper 38 is introduced into a fiber guiding device 55 owing to the displacement of the plug-onto-fiber mounting tool 36 toward the central part of the framework parallel to the reference frame. The guiding device 55 is intended to guide the fiber toward the inlet of the longitudinal conduit of the plug, which is then immobilized by the holding device 54 in a defined position. This guiding device has, for example a guiding groove forming a V, the tip of which faces the inlet of the abovementioned conduit of a plug immobilized as indicated above. The bottom of the guiding groove rises gradually from the mouth which groove the fiber penetrates, at the tip of the V. In a preferred embodiment, the guiding groove is covered by a removeable cover (not shown) allowing the inserted fiber to be held down toward the bottom of the groove should any remaining curvature of the fiber, resulting from it being wound beforehand on the coil 45, tend to make the end of this fiber come out of the groove.

The displacement of the plug-onto-fiber mounting tool toward the central part of the framework continues so that the fiber introduced into the guiding device 55 penetrates the longitudinal conduit of the plug 8' and passes right through it so that the end of this fiber exits from the plug with a length sufficient for it to be able to be placed between moving jaws of a tool 56 for immobilizing the fiber by gripping it.

The tool 56 is assumed to be servocontrolled; it is designed to fix that end of the jumper fiber running into the plug, from the other side of this plug with respect to the guiding device. The jaws that the tool 56 has are designed to move transversely with respect to the direction of displacement of the tool.

A plug crimping tool 57 is used to fix the plug to the jumper fiber, in this case at that end of this plug via which the fiber is introduced.

A sheath stripping tool having two moveable stripping vees 58 is placed between that end of the plug from which the fiber emerges and the fiber immobilizing tool 56. It is pneumatically servocontrolled and the vees between which the fiber then sheathed is placed, bear laterally on the sheath via a mutual closing-together movement so as to penetrate thereinto. A limited withdrawal of the plug-onto-fiber mounting tool toward the edge of the framework results in the fiber being stripped over a defined length, this depending on the extent of the withdrawal.

A cutting tool 59, positioned flush with that end of the plug from which the fiber emerges, moves transversely to the direction of translation of the plug-onto-fiber mounting tool; it has a diamond that cuts the fiber flush with the plug, while this fiber is held taut by the immobilizing device.

After the fiber cutting operation, which ends a plug being mounted on a fiber, the plug is removed by means of a gripper 61 carried by the plug holding tool 43 of a plug handling tool 39 shown in FIGS. 14 and 15.

The plug-onto-fiber mounting tool 36 is then taken back from the position where it is close to the center of the framework to the disengagement position where it is distant therefrom.

The gripper 61 forms part of the plug handling tool 39 shown in FIGS. 14 and 15. As indicated above, this tool comprises a subassembly 39B which is suspended like a bell beneath a carrying structure, such as a bracket, this structure being shown only by an upper member 62 in FIG. 14. The bracket-shaped carrying structure 39B is mounted on the support plate 39A, which can move translationally parallel to the reference plane in the bottom of the framework where this support plate is housed, as shown schematically in FIG. 9.

The gripper 61 is mounted laterally on the end of a rod-shaped arm 60 of the plug holding tool 43. The latter is mounted on a support which here is assumed to be a module in which is housed the servocontrol device that allows the arm to rotate through 90° about its longitudinal axis on either side of a central position and to slide longitudinally. The central position is intended to allow the gripper 61 to grasp a plug, between two parallel jaws that it carries, by straddling it. The movements intrinsic to the arm of the plug holding tool 43 are combined with those imposed by the control logic on the tool 39 itself in order to:

take hold of a plug 8' mounted on a fiber J at the end of a mounting operation carried out by means of the tool 36;

move this plug to a connection member located in a defined position in the distribution frame; and orient the plug in a position allowing it to be inserted into the connection member.

In the embodiment shown here, a downward movement of the arm of the plug holding tool allows the gripper to grasp a plug 8' at the tool 36 after this plug has been mounted on a fiber and before the tool 36 leaves the position in the central area of the framework that it occupied during the plug mounting operations.

By rotating the arm, the plug, held by the gripper, is positioned to the right or to the left of the arm for the purpose of inserting it into a connection member belonging to a socket in a rack, when connection members of this socket have already been equipped with plugs and knowing that a jumper guide member 17 borders each socket laterally, in order to guide the jumper fibers connected to the connection members of this socket.

In the embodiment shown here, the jumper guide members of a rack have curves which tend to direct the jumper fibers toward the cross-connect area 12 that they cross.

The connection members of a socket are aligned and bordered laterally by two curved jumper guide members, shown schematically in FIG. 5; the distance between the compartment of a connection member of a socket and a jumper guide member therefore is not the same for each of the compartments of a socket. Consequently, the freedom of passage of the plug holding gripper 61 alongside a jumper guide member, for inserting a plug into a compartment or for withdrawing it, varies with the vertical position of the compartment chosen along the jumper guide member. This results in one gripper position being privileged over another with respect to the plug holding arm that carries this gripper. This position is preferably chosen to be the same for all the sockets whose jumper guide members have the same orientation and, for example, for all the sockets of the same rack of a multirack distribution frame. The arm 60 is therefore positioned further away from the cross-connect area than the gripper 61 relative to the compartment of a connection member of a rack, during insertion of a plug into this compartment, or during removal from this compartment.

According to the invention, a plug handling tool 39 is accurately positioned, for inserting a plug into a connection member or alternatively for extracting it therefrom, by using the positioning tool 42 fixed above the plug holding tool 43 on one side of the subassembly 39B. For this purpose, the tool 42 cooperates with the marker means which are provided for it in the distribution frame. As described above in conjunction with FIG. 5, these marker means are for example holes 67 or else notches 68 uniformly distributed along the troughs. The end 64 of the positioning tool is shaped so as to be positioned in a hole or notch of complementary shape during a displacement operation, controlled by the control logic, carried out by the tool 39. This displacement operation allows the tool to be taken up to the mark which corresponds to the connection member into which a plug is to be inserted or from which it is to be extracted. It results in a displacement of the support plate for the tool 39 parallel to the reference plane as far as the mark, the subassembly 39B being placed in or taken to a position set back with respect to this reference plane. This setting-back is designed to allow the plug holding tool 43 and the positioning tool 42 to be rotated from a position in which they were parallel to the reference plane to a position in which they are perpendicular to it and have their ends pointed theretoward. The transverse displacement of the subassembly 39B on its support plate in the direction of the reference plane then allows the end 64 of the positioning arm to be housed in the marker hole 67 corresponding to the intended connection member. The facility of adjusting the height of the plug holding tool is used to bring the plug carried by the gripper to the height of the intended connection member in the case of a plug insertion operation or alternatively to bring the gripper to the height of the plug present in this member in the case of extraction.

As indicated above, when inserting a plug the gripper is positioned on the side of the positioning tool in a manner allowing it to be pushed in, perpendicular to the reference plane, until the plug carried by the gripper has been suitably inserted into the intended connection member.

The insertion is performed by translation of the arm 60 of the plug holding tool 43 perpendicular to the reference plane, for example by the action of a cylinder carried by the subassembly 39B (FIG. 9). A relative adjustment of the position of a plug, during its insertion into a connection member is obtained by a known gripper fitting which offers relative elasticity and which prevents damage to the plug should the alignment be slightly imperfect.

The placing of a jumper fiber between two connection members of a distribution frame according to the invention is carried out by a sequence of operations which are described below.

The first operation to be carried out consists in mounting a plug on a jumper fiber for the purpose of connecting this plug to a first of the connection members in question. This operation results in a plug 8', extracted from a storage device (not shown), being placed in a defined mounting position in the holding device 54 of the tool 36. This plug placing operation is followed by the introduction of one end of a jumper fiber J, unwound from the storage coil 45 and delivered by the nozzle 50, into the guiding device 55. The introduction is performed by the gripper 38 and by the displacement of the plug-onto-fiber mounting tool 36 toward the central part of the framework 44. The plug mounting operation involves stripping the fiber at its end, cutting and/or shaping this end for the purpose of linking this jumper fiber end to end with another fiber, and in fixing the plug on the fiber. This fixing operation is carried out here by crimping a cylindrical portion of the plug onto the fiber.

A second operation consists in positioning the plug mounted on the end of the fiber in a first of the two connection members to be interconnected. For this purpose, the plug is extracted from the holding device 54 by means of the gripper 61 carried by the holding tool 43 of the plug handling tool 39, after the latter tool has been moved toward the plug-onto-fiber mounting tool 36. This tool 36 is then taken to the disengagement position at the end of the framework insofar as it no longer has to be used until the next plug mounting operation.

The plug is positioned by means of the fiber handling tool 39, as indicated above. The support plate 39A is moved translationally parallel to the reference plane and the subassembly 39B is moved toward the rear and rotated through a right angle so that the positioning tool 42 faces the reference plane. The arm 60 of the plug holding tool 43 is rotated about its longitudinal axis, which brings the gripper 61 so as to be placed laterally with respect to the rod of the arm. The positioning tool and the plug holding tool come to the level corresponding to that of the intended socket in the distribution frame. A forward displacement, that is to say a displacement toward the reference frame of the subassembly 39B, allows this subassembly to be temporarily secured to the distribution frame by means of the positioning tool 42 in the position to be reached, requested by the control logic for the intended connection member. A translation of the holding tool 43 toward the intended connection member 8 allows the plug held by the gripper 61 to be introduced into this member.

During all the abovementioned displacements, fiber is unwound and/or possibly rewound, depending on the requirements, by the fiber storage/delivery tool under the control of the control logic.

A third operation consists in placing the fiber J from the first intended connection member, in which the first plug has been installed, to the second intended connection member by the jumper connection in the course of being made. For this purpose, the nozzle 50 of the fiber handling tool is made to move along the path defined by the control logic between the two connection members. According to the invention, this path is systematically chosen with at most two corresponding levels, each at the vertical level of the horizontal trough placed immediately beneath one of the two connection members in question. The possible change in level, needed in order to pass from one trough to another, takes place in the cross-connect area 12 between racks in which the jumper fiber used adopts an S shape, with two bends of opposite orientations. The change-of-level bends are located in just one cross-connect area for all the jumpers in the case of a two-rack distribution frame, but there may be a plurality of cross-connect areas in the case of a distribution frame having a larger number of racks, each jumper having, however, only at most two change-of-level bends.

The amount of jumper fiber needed to make a jumper is paid out by the motor-driven pulley 48 of the fiber storage/delivery tool at a rate controlled by the control logic so as not to subject the fiber to tensile forces during the placement. The amount of fiber paid out for a jumper may be defined so that the jumper produced is slightly longer than theoretically necessary, so that the radii of curvature of the jumper along its path correspond to predetermined values.

In one embodiment, a gripper 46, able to move along the troughs, allows that portion of a fiber already in place to be immobilized temporarily and at a discrete point depending on the requirements, with the displacement of this gripper and its action being controlled by the control logic depending on the placement path chosen for a fiber and on the progress of this placement.

The output of fiber by the motor-driven pulley 48 accompanies the displacement of the various constituent members involved in the placement and in particular the vertical displacement of the framework between its vertical supports 34, the horizontal displacement of these supports along the distribution frame, and/or the various displacements of the distribution head 37.

This therefore causes the nozzle to place the fiber emerging from the plug in position in the first intended connection member 8 so that the fiber follows, internally, the jumper guide member 17 provided for this purpose along the socket having this connection member, in order to join the trough 16B situated immediately beneath this socket. The nozzle continues its placement in the trough until this terminates in the cross-connect area 12 between racks. The amount of fiber needed to form the two intended opposed bends in this cross-connect area is paid out by the motor-driven pulley 48 of the storage/delivery tool while the nozzle moves vertically in the central passage provided between the guides 18B which partially extend the troughs in the cross-connect area for the two racks located on either side of this area.

The placement operation continues until the deposited fiber reaches the level of the second connection member in which the jumper fiber being placed has to terminate. The fiber is then temporarily immobilized at the point reached by means of the moveable gripper 46 and sufficient fiber is output by the motor-driven wheel 47" to allow a second plug to be mounted on the fiber after this fiber has been cut flush with the nozzle 50 with a length sufficient to allow the jumper connection to be completed, that is to say as far as insertion of the second plug into the second connection member.

The gripper 61 is then used to hold the fiber and cut it to the length chosen by the control logic, this cutting operation being assumed here to be performed by a projecting cutting relief 66 on the lower part of the arm 60 bearing on the fiber (FIG. 14). The second end, then free, which terminates the jumper fiber portion already placed, is then subjected to an operation during which a plug 8' is mounted on the end in the manner described above by means of the plug-onto-fiber mounting tool 36. For this purpose, the free, second end of the fiber is suitably oriented by means of the gripper 38 so as to be in a position identical to the first end of the fiber with respect to the plug-onto-fiber mounting tool. When a plug has been mounted on the second end of the fiber, a sequence of operations for positioning and inserting the newly mounted plug into the second connection member, as described above in the case of the plug mounted on the first end of the jumper fiber, is carried out.

As is known, the changes in jumper connections over time commonly involves the withdrawal of existing jumpers in order to establish links between connection members which are no longer those that were connected by the withdrawn jumpers. Provision is made for these withdrawal operations to be carried out using the means that the set of tools defined above provides.

The withdrawal of a jumper is facilitated, whatever the number of racks provided for a distribution frame, by the fact that there are only at most two change-of-level bends along the path followed by the jumper between the sockets at which the jumper is connected and that it is possible for the jumper, one end of which has been stripped of its plug, to be made to slide by suitable pulling forces being exerted on its second end.

When withdrawing a jumper between two connection members of two sockets of the distribution frame, the gripper 61 carried by the plug holding tool 43 is used to grip the plug 8' housed in a first of the two connection members in question and to extract it by a rearward movement of the plug holding tool. The plug handling tool 39, and more particularly the plug holding tool 43, is prepositioned relative to the connection member as previously intended in the jumper placement phase by using the positioning tool 42 and by performing the various displacements of the framework 44 and/or of the plug handling tool 39 which were already envisaged above for positioning the plug holding tool 43 before a plug is inserted into a connection member. The rearward displacement of the plug 8' held by the gripper 61 is used to cut the fiber flush with the plug by a displacement that brings the fiber so as to bear against a stop serving as cutting instrument.

In one embodiment and if the connection member does not have to be immediately reused, provision is made to reintroduce the plug that has just been extracted into the connection member where it was, so that it blocks off the compartment of this member for protection purposes, after having been separated from the fiber on which it was mounted.

The gripper 61 is brought level with the second connection member 8 by displacement of the framework 34 and of the plug handling tool 39 so as to again be in a position allowing it to extract the plug 8', which is then inserted in this second connection member. The conditions under which the extraction is performed correspond to those that resulted in the extraction from the first connection member. The gripper 61 fixes onto the plug to be extracted before being brought back to the rear by a retraction movement of the plug holding tool 43. In the example shown, the subassembly 39B is designed to undergo a rotational movement which brings the plug positioning and holding tools and the plug 8' back into a position in which they are parallel to the reference plane. The section of jumper fiber which connected the two connection members envisaged above, and which then remains in the troughs lying in the path followed by the fiber and in the cross-connect area between racks, is then extracted by pulling on it.

Although it may be possible for the withdrawal to be performed manually, by pulling directly on the fiber, provision is made according to the invention to use one and/or the other of the two grippers 38 and 61 to keep the fiber immobilized in that one of its two ends to which pulling is applied. This pulling is obtained by servocontrolled displacement of the framework and/or possibly of the tool 39 parallel to the reference plane and, for example, from the right to the left in the case of a framework having a tool 39 whose plug holding tool 43 is oriented to the right, when this tool is parallel to the reference plane, as shown in FIGS. 14 and 15. Complete extraction of a jumper fiber may possibly involve the actions of the grippers 38 and 46 that alternately grip the jumper fiber to be extracted being coordinated. The gripper 38 is used to pull on the fiber during a displacement, or possibly several successive displacements in the same direction, of the framework 44, these displacements being separated from one another by a reverse displacement of the framework, bringing the gripper 38 back to its initial position after it has released the fiber. The gripper 46 assumed to be positioned close to the initial position of the gripper 38, as envisaged above, then allows the fiber to be immobilized near this front position before it is released by the gripper 38. The return of the gripper 38, then released, to its initial position close to the gripper 46 allows it again to grip the fiber close to this gripper 46. The release of the gripper 46 followed by a new displacement of the gripper 38 from its initial position allows an additional section of the jumper fiber to be extracted, the operation being repeated until this jumper fiber has been completely extracted.

There is claimed:

1. A high-density optical distribution frame for selectively interconnecting optical fiber links, said distribution frame comprising: jumpers, which also consist of optical fibers, within the context of a telecommunication installation in which sockets are arranged in rows on parallel support members in a two-dimensional matrix structure and are provided with individual connection members for the links, and wherein each individual connection member of a socket is designed to cooperate with a complementary connection member with which the end of a jumper is equipped, which complementary connection member is placed on the front face of said socket, said distribution frame having one or more distribution racks on one side of which is provided an area for the jumpers to run, the jumpers being fitted with plug-in connection members on each of their ends so as to each connect an individual junction member of a socket carried by a support member to another individual junction member of another socket carried by another support member, in which distribution frame said socket supports are mounted on the front face of said distribution rack, a cross-connect area being open toward the front in order to receive said jumpers, said distribution frame further maintaining a robotized set of special tools for making jumper connections, such that during the process of making jumper connections which is carried out by said robotized set of specialized tools, which is capable of acting, being moved and positioned with respect to said sockets so as:

to mount a plug on one end of a coiled optical jumper reserve, used for constituting said jumpers;

to position this plug in a first individual connection member of a given socket of a rack;

to fit said jumper uncoiled from this first given individual connection member, and through said cross-connect area, as far as a second given individual connection member of another socket;

to adjust the length of said uncoiled jumper and to cut it, converting it into a section separated from the rest of the still coiled jumper;

to fit a plug on the cut end of said uncoiled jumper section; and to position the newly mounted plug on the end of the section in the second connection member; and each rack having a marker means to allow said robotized set of specialized tools to know the position of each connection point at each socket in the set formed by all the sockets of said distribution frame, said sockets, which are identical and arranged horizontally on parallel support sections on the front face of a rack, having connection members designed to cooperate with complementary connection members, of the plug type, each mounted on one end of a jumper, which fit, on the front face of a socket, each in one of a vertically aligned compartments of said sockets, said marker means being spaced regularly at a pitch corresponding to that of said sockets, on said parallel supports where said sockets are mounted, in order to allow at least one positioning tool of a plug handling tool to be positioned relative to an individual socket connection member of said distribution frame, by automated displacement of this tool and/or of at least some of the tools of the set of specialized tools of which it forms part.

2. The optical distribution frame claimed in claim 1, in which said marker means further comprises means for positioning a plug handling tool with respect to a connection member of a socket, said means using a positioning tool provided with a polarizer and associated with a plug holding tool in said plug handling tool, and at least one shaped piece, complementary to the polarizer and provided near the front face of each socket in an area where a housing provided for this socket opens into an individual support member via which this socket is fixed onto one of said parallel supports, said polarizer being displaced so as to penetrate the complementary hollow shaped piece associated with a given socket, when a plug fitted to a jumper has to be introduced into or extracted from an individual connection member of this given socket.

3. The optical distribution frame claimed in claim 1, in which said jumpers connected by plugs to a socket are run downward from said individual connection members of this socket via a jumper guide member, in a given direction, inside a horizontal trough placed at the bottom of the row in which this socket occurs, in order to be directed toward the sockets in which they terminate moreover, and in which the jumper guide members of a rack are all designed so as to orient said jumpers in the direction of the cross-connect area in which said jumpers are directed by guides which partially extend across the troughs in the central area and which provide a central passage between the guides via which said jumpers are individually introduced into said cross-connect area, by means of a jumper placement tool included in said robotized set of specialized tools, said tool and/or said set of tools having the facility of moving vertically between said guides that extend across said troughs, in this central passage, in order to run each jumper in said cross-connect area between the two vertical levels of the horizontal troughs each serving one of the sockets to which this jumper is connected.

4. The optical distribution frame claimed in claim 3, in which said guides for orienting the jumpers further comprise guides, called general guides, which extend horizontally across said troughs in said cross-connect area provided between two racks, said guides being shaped to guide said jumpers toward the interior of said cross-connect area and which provide a vertical passage between said guides on the front face of the distribution frame in order to allow mechanical introduction of the jumpers one by one into said cross-connect area, and wherein said guides include strand guides which are shaped and extend within said troughs downward from the cross-connect area so that each orients a strand of the jumpers, running through said trough.

5. The optical distribution frame claimed in claim 1, in which linking fibers are connected to said sockets by means of distribution and connection modules housed in said racks in the form of fiber cassettes, individually articulated on individual support members which are each in the form of an arm fixed to at least one parallel support for a row of sockets via one end in which a housing is provided for a socket, each arm carrying articulation means for a cassette at a second end and forming a U-shaped channel for the passage and retention of intermediate linking fibers between said individual connection members of said socket, which is housed in the arm, and the linking fibers, which come from transmission or distribution cables terminating in said distribution frame and which have a coiled end connected by a splice to one of said intermediate linking fibers in the cassette carried by the arm.

6. The optical distribution frame claimed in claim 5, in which said arms, forming said individual members for supporting said sockets and said cassettes in a rack, are designed to be able to be assembled in groups, each group having arms assembled to said sockets of two adjacent rows each of said rows fixed to two parallel supports, one of said parallel supports being common to said rows and along which said arms are alternately positioned, one above and the next one below said parallel support common to said rows, said arms, which are identical to one another, being doubly bent in opposite directions in two dimensions and preferably at mid-length, in order to allow said cassettes, carried respectively by alternate arms on either side of one of said parallel supports which is common to said group, to be placed in the same alignment inside said rack when they are in the operating position, because of the alignment of the articulation members for said cassettes that these alternate arms have on either side of the same common support, and as a result of the respective dimensions of said cassettes and of said arms.

7. The optical distribution frame claimed in claim 5, in which each arm has, on a second end, a cassette articulation member which forms a shaft intended to be horizontal when said arm is in place in said distribution frame, this member projecting laterally from a flat extension of the bottom of the U-shaped channel for intermediate fibers that said arm forms, so as to free the passage for these intermediate fibers toward the inside of said cassette that said arm carries, whatever the position of this cassette in relation to said arm carrying said cassette.

8. The optical distribution frame claimed in claim 5, in which each cassette, has an open module with a flat bottom, which is symmetrical with respect to a transverse mid-plane, inside which are provided fiber-coiling structures and immobilization means for splices between fibers, having a shaft clip articulation members, complementary to said articulation member carried by a support arm, which are arranged symmetrically with respect to the transverse plane at the ends of one of the long sides of the module formed by said cassette and which are preferably produced so as to be able to be articulated, laterally and elastically, on an articulation member carried by an arm, each of the complementary articulation members of a cassette being surrounded by two fiber conduits, a first of these conduits formed toward the inside of said cassette with respect to the other and to said complementary articulation member that it adjoins, being intended for said intermediate fibers to run toward said conduit of said arm carrying said cassette, when the latter is carried by means of said complementary articulation member that this first conduits adjoins, the second of these conduits, made toward the outside of said cassette with respect to said first conduit and to said complementary articulation member that it adjoins, being intended for the passage of said fibers coming from transmission or distribution cables which are connected to said cassette, each cassette being articulated by one or other of these two complementary articulation members in that one of the two possible arrangements provided for said arm in the group of which it forms part.

9. The optical distribution frame claimed in claim 1, in which the individual connection members connected by said jumpers are carried by sockets located on different racks and in which these jumpers terminate via horizontal troughs, each jumper being furnished with at most two change-of-level bends in a cross-connect area between said racks in question in order to pass from one of said troughs to the other.

10. The optical distribution frame claimed in claim 1, which includes a robotized set composed of servocontrolled specialized tools carried by a moveable framework, the displacement of which is servocontrolled by a control logic programmed so as to be able to move past the front faces of said racks of said distribution frame where the respective front faces of said sockets, the connection members of which are intended to be connected together by means of optical jumper fibers from point to point, are aligned, said framework carrying at least:

an optical jumper fiber storage/delivery tool in which a coil of fiber is stored for the purpose of making jumpers one by one, with a specific length determined according to the actual positions of said two connection members to be interconnected;

a multifunction servocontrolled tool for mounting a plug on a fiber, for carrying out the various operations needed for mounting a connection plug, complementary to a connection member of one of said sockets of said distribution frame, on an end of said fiber coming from said optical jumper fiber storage/delivery tool;

a fiber handling tool, composed of two subassemblies responsible respectively for delivering said fiber in a defined manner during the various operations associated with making jumper connections and for gripping it, more particularly near one end, in order to orient and/or position this end in a predetermined manner, the first subassembly including a moveable distribution head fitted with a nozzle via which said fiber is delivered, the second subassembly including a gripper which can move vertically and can rotate partly, which is used to grip said fiber so as to displace one of its ends for the purpose of positioning it;

a plug handling tool for gripping a plug mounted on a fiber, for displacing it and for connecting it by plugging it into a connection member having a given position in said distribution frame in the jumper connection phase, or for extracting it in the withdrawal phase.

11. A method for making jumper connections for an optical distribution frame, said method comprising the steps of:

allowing selective interconnection of optical fiber links by means of jumpers, which also consist of optical fibers, within the context of a telecommunication installation, in which said distribution frame maintains sockets, which are arranged in rows, on parallel support members on the front face of one or more distribution racks defining a two-dimensional matrix structure, and which are equipped with individual connection members for the links, and where each individual connection member of a socket is designed to cooperate with a complementary plug-in connection member with which the end of a jumper is fitted, and which complementary plug-in connection member is placed on the front face of said socket, in which method a jumper is placed between two individual connection members belonging to different sockets of said distribution frame by means of a robotized set of specialized tools which carries out the following succession of operations:

mounting of a plug on one end of a coiled optical jumper reserve used to form said jumpers;

positioning of this plug in a first individual connection member of a given socket of a rack;

fitting of jumper fiber uncoiled from the first individual connection member as far as a second given individual connection member of another socket;

adjusting of the length and cutting of said uncoiled jumper in order to convert it into a section separated from the still coiled jumper reserve;

fitting of a plug on one end of said uncoiled jumper section; and positioning of said newly mounted plug on the end of the section in said second connection member.

12. The method claimed in claim 11, further comprises the step of removing jumpers by:

withdrawing one of said plugs of said jumper to be removed by means of a plug handling tool after this tool has been positioned in the individual connection member where said plug to be withdrawn is located;

separating said withdrawn plug from the end of said jumper where it was placed, by breaking said jumper near this end by means of said plug handling tool;

withdrawing the second plug from said jumper to be removed by means of said plug handling tool after this tool has been positioned in said individual member where said second plug to be withdrawn is located; and pulling on a gripped fiber from said second plug in order to extract this fiber by a movement tending to make it slide along the path along which it was extended and out of the cross-connect area through which it passed.

13. The method claimed in claim 12, in which the withdrawal pulling force is exerted on the fiber, immobilized by a gripper of the set of tools, by translation of at least that part which has the gripper of the set of tools.

14. A high-density optical distribution frame for selectively interconnecting optical fiber links said distribution frame comprising: jumpers, which also consist of optical fibers, within the context of a telecommunication installation in which sockets are arranged in rows on parallel support members in a two-dimensional matrix structure and are provided with individual connection members for the links, and wherein each individual connection member of a socket is designed to cooperate with a complementary connection member with which the end of a jumper is equipped, which complementary connection member is placed on the front face of said socket, said distribution frame having one or more distribution racks on one side of which is provided an area for the jumpers to run, the jumpers being fitted with plug-in connection members on each of their ends so as to each connect an individual junction member of a socket carried by a support member to another individual junction member of another socket carried by another support member, in which distribution frame said socket supports are mounted on the front face of said distribution rack, a cross-connect area being open toward the front in order to receive said jumpers, said distribution frame further maintains a robotized set of special tools for making jumper connections, such that during the process of making jumper connections which is carried out by a robotized set of specialized tools, which is capable of acting, being moved and positioned with respect to said sockets so as:

to mount a plug on one end of a coiled optical jumper reserve, used for constituting said jumpers;

to position this plug in a first individual connection member of a given socket of a rack;

to fit said jumper uncoiled from this first given individual connection member, and through said cross-connect area, as far as a second given individual connection member of another socket;

to adjust the length of said uncoiled jumper and to cut it, converting it into a section separated from the rest of the still coiled jumper;

to fit a plug on the cut end of said uncoiled jumper section; and to position the newly mounted plug on the end of the section in the second connection member; and wherein said distribution frame maintains linking fibers, connected to said sockets by means of distribution and connection modules housed in said racks in the form of fiber cassettes, individually articulated on individual support members which are each in the form of an arm fixed to at least one parallel support for a row of sockets via one end in which a housing is provided for a socket, each arm carrying articulation means for a cassette at a second end and forming a U-shaped channel for the passage and retention of intermediate linking fibers between said individual connection members of said socket, which is housed in the arm, and the linking fibers, which come from transmission or distribution cables terminating in said distribution frame and which have a coiled end connected by a splice to one of said intermediate linking fibers in the cassette carried by the arm.

15. A high-density optical distribution frame for selectively interconnecting optical fiber links, said distribution frame comprising: jumpers, which also consist of optical fibers, within the context of a telecommunication installation in which sockets are arranged in rows on parallel support members in a two-dimensional matrix structure and are provided with individual connection members for the links, and wherein each individual connection member of a socket is designed to cooperate with a complementary connection member with which the end of a jumper is equipped, which complementary connection member is placed on the front face of said socket, said distribution frame having one or more distribution racks on one side of which is provided an area for the jumpers to run, the jumpers being fitted with plug-in connection members on each of their ends so as to each connect an individual junction member of a socket carried by a support member to another individual junction member of another socket carried by another support member, in which distribution frame said socket supports are mounted on the front face of said distribution rack, a cross-connect area being open toward the front in order to receive said jumpers, said distribution frame maintaining a robotized set of special tools for making jumper connections, such that during the process of making jumper connections which is carried out by a robotized set of specialized tools, which is capable of acting, being moved and positioned with respect to said sockets so as:

- to mount a plug on one end of a coiled optical jumper reserve, used for constituting said jumpers;
- to position this plug in a first individual connection member of a given socket of a rack;
- to fit said jumper uncoiled from this first given individual connection member, and through said cross-connect area, as far as a second given individual connection member of another socket;
- to adjust the length of said uncoiled jumper and to cut it, converting it into a section separated from the rest of the still coiled jumper;
- to fit a plug on the cut end of said uncoiled jumper section; and
- to position the newly mounted plug on the end of the section in the second connection member; and wherein said robotized set of specialized tools on said distribution frame maintains servocontrolled specialized tools carried by a moveable framework, the displacement of which is servocontrolled by a control logic programmed so as to be able to move past the front faces of said racks of said distribution frame where the respective front faces of said sockets, the connection members of which are intended to be connected together by means of optical jumper fibers from point to point, are aligned, said framework carrying at least:

- an optical jumper fiber storage/delivery tool in which a coil of fiber is stored for the purpose of making jumpers one by one, with a specific length determined according to the actual positions of said two connection members to be interconnected;
- a multifunction servocontrolled tool for mounting a plug on a fiber, for carrying out the various operations needed for mounting a connection plug, complementary to a connection member of one of said sockets of said distribution frame, on an end of said fiber coming from said optical jumper fiber storage/delivery tool;
- a fiber handling tool, composed of two subassemblies responsible respectively for delivering said fiber in a defined manner during the various operations associated with making jumper connections and for gripping it, more particularly near one end, in order to orient and/or position this end in a predetermined manner, the first subassembly including a moveable distribution head fitted with a nozzle via which said fiber is delivered, the second subassembly including a gripper which can move vertically and can rotate partly, which is used to grip said fiber so as to displace one of its ends for the purpose of positioning it;
- a plug handling tool for gripping a plug mounted on a fiber, for displacing it and for connecting it by plugging it into a connection member having a given position in said distribution frame in the jumper connection phase, or for extracting it in the withdrawal phase.

* * * * *